United States Patent
Chan et al.

(10) Patent No.: US 10,404,961 B2
(45) Date of Patent: Sep. 3, 2019

(54) AUXILIARY DATA FOR ARTIFACTS—AWARE VIEW SYNTHESIS

(71) Applicant: VERSITECH LIMITED, Hong Kong (CN)

(72) Inventors: Shing Chow Chan, N.T. (CN); Xi Guang Wei, Shandong (CN)

(73) Assignee: VERSITECH LIMITED, Hong Kong (CN)

(*) Notice: Subject to any disclaimer, the term of this patent is extended or adjusted under 35 U.S.C. 154(b) by 0 days.

(21) Appl. No.: 15/346,678

(22) Filed: Nov. 8, 2016

(65) Prior Publication Data
US 2017/0188002 A1 Jun. 29, 2017

Related U.S. Application Data

(60) Provisional application No. 62/285,825, filed on Nov. 9, 2015.

(51) Int. Cl.
*H04N 13/122* (2018.01)
*H04N 13/128* (2018.01)
(Continued)

(52) U.S. Cl.
CPC ............ *H04N 13/122* (2018.05); *G06K 9/38* (2013.01); *G06T 19/00* (2013.01); *H04N 13/128* (2018.05);
(Continued)

(58) Field of Classification Search
None
See application file for complete search history.

(56) References Cited

U.S. PATENT DOCUMENTS

| | | | |
|---|---|---|---|
| 2,605,361 A | 7/1952 | Cutler | |
| 5,351,314 A * | 9/1994 | Vaezi | G06K 9/44 382/258 |

(Continued)

FOREIGN PATENT DOCUMENTS

CN 104023220 B * 1/2016 ......... H04N 13/0011

OTHER PUBLICATIONS

Machine translation of CN 104023220 B.*
(Continued)

*Primary Examiner* — Michelle M Entezari
(74) *Attorney, Agent, or Firm* — Leason Ellis LLP

(57) ABSTRACT

Original or compressed Auxiliary Data, including possibly major depth discontinuities in the form of shape images, partial occlusion data, associated tuned and control parameters, and depth information of the original video(s), are used to facilitate the interactive display and generation of new views (view synthesis) of conventional 2D, stereo, and multi-view videos in conventional 2D, 3D (stereo) and multi-view or autostereoscopic displays with reduced artifacts. The partial or full occlusion data includes image, depth and opacity data of possibly partially occluded areas to facilitate the reduction of artifacts in the synthesized view. An efficient method is used for extracting objects at partially occluded regions as defined by the auxiliary data from the texture videos to facilitate view synthesis with reduced artifacts. Further, a method for updating the image background and the depth values uses the auxiliary data after extraction of each object to reduce the artifacts due to limited performance of online inpainting of missing data or holes during view synthesis.

27 Claims, 17 Drawing Sheets
(13 of 17 Drawing Sheet(s) Filed in Color)

(51) Int. Cl.
*H04N 13/167* (2018.01)
*H04N 13/178* (2018.01)
*G06K 9/38* (2006.01)
*G06T 19/00* (2011.01)
*H04N 13/00* (2018.01)

(52) U.S. Cl.
CPC ......... *H04N 13/167* (2018.05); *H04N 13/178* (2018.05); *H04N 2013/0081* (2013.01)

(56) References Cited

U.S. PATENT DOCUMENTS

| | | | | |
|---|---|---|---|---|
| 5,590,065 | A * | 12/1996 | Lin | H03H 17/0286 708/313 |
| 6,307,959 | B1 * | 10/2001 | Mandelbaum | G06T 7/55 382/104 |
| 6,989,840 | B1 * | 1/2006 | Everitt | G06T 15/04 345/422 |
| 8,542,933 | B2 * | 9/2013 | Venkataraman | G06T 9/00 382/233 |
| 9,621,869 | B2 * | 4/2017 | Davidson | H04N 13/0011 |
| 10,089,740 | B2 * | 10/2018 | Srikanth | H04N 5/23216 |
| 2006/0233290 | A1 * | 10/2006 | Gurrapu | H03H 17/0657 375/350 |
| 2009/0190852 | A1 | 7/2009 | Lim et al. | |
| 2012/0001902 | A1 | 1/2012 | Lee et al. | |
| 2012/0114225 | A1 | 5/2012 | Lim et al. | |
| 2012/0147205 | A1 * | 6/2012 | Lelescu | H04N 13/0029 348/218.1 |
| 2013/0033570 | A1 * | 2/2013 | Shand | H04N 13/0029 348/43 |
| 2013/0182184 | A1 | 7/2013 | Senlet et al. | |
| 2013/0286012 | A1 * | 10/2013 | Medioni | G06T 17/00 345/420 |
| 2013/0314501 | A1 * | 11/2013 | Davidson | H04N 13/0011 348/46 |
| 2013/0322742 | A1 * | 12/2013 | Walton | G06K 9/0063 382/159 |
| 2014/0247365 | A1 * | 9/2014 | Gardner | H04N 5/21 348/165 |
| 2015/0091900 | A1 * | 4/2015 | Yang | G06T 5/006 345/419 |
| 2015/0170371 | A1 * | 6/2015 | Muninder | H04N 13/128 382/154 |
| 2016/0110613 | A1 * | 4/2016 | Ghanem | G06K 9/00778 382/103 |
| 2016/0142042 | A1 * | 5/2016 | Kamal | H03H 17/0248 708/190 |
| 2017/0053412 | A1 * | 2/2017 | Shen | G06K 9/6264 |

OTHER PUBLICATIONS

G. J. Sullivan, J. R. Ohm, W. J. Han and T. Wiegand, "Overview of the High Efficiency Video Coding (HEVC) Standard," *IEEE Trans. Circuits and Systems for Video Technology*, vol. 22, pp. 1649-1668, 2012.
G. Tech, K. Wegner, Y. Chen, and S. Yea, "3D-HEVC draft text 1," in Proceeding of the 5th Meeting of Joint Collaborative Team on 3D Video Coding Extensions (JCT-3V), Document JCT3V-E1001, Vienna, Austria, Aug. 2013, 94 pages.
S.C. Chan, H. Y. Shum and K. T. Ng, "Image-based rendering and synthesis," *IEEE Signal Processing Magazine*, vol. 24, pp. 22-23, 2007.
J. Lainema, F. Bossen, W. J. Han, J. Min and K. Ugur, "Intra Coding of the HEVC standard," *IEEE Trans. Circuits and Systems for Video Technology*, vol. 22, pp. 1792-1801, 2012.
http://en.wikipedia.org/wiki/Billinear_interpo https://en.wikipedia.org/wiki/Bilinearinterpolationlation.
T. Kariya, and H. Kurata. "Generalized Least Squares," J. Wiley, 2004.
J. Canny, "A Computational Approach to Edge Detection," *IEEE Trans. Pattern Analysis and Machine Intelligence*, vol. 8, No. 6, pp. 679-698, 1986.
Y. Chuang. B. Curless, D. H. Salesin and R. Szeliski, "A Bayesian approach to digital matting," in Proc. IEEE Comput. Soc. Conf. CVPR. Dec. 2001, vol. II, pp. 264-271.
M. Ng, G. Qiu and A. Yip, Numerical Methods for Interactive Multiple Class Image Segmentation Problems, International Journal of Imaging Systems and Technology, 20 (2010), pp. 191-201.
X. Kong, M. Ng and Z. Zhou, Transductive Multi-Label Learning via Aplha Matting, IEEE Transaction on Knowledge and Data Engineering, vol. 25, pp. 704-719, 2013.
H. Y. Shum, J. Sun, S. Yamazaki, Y. Lin, and C. K. Tang. "Pop-Up Light Field: An Interactive Image-Based Modeling and Rendering System." ACM Trans. On Graphics, vol. 23, issue 2, pp. 143-162, Apr. 2004.
Ricardo A. Marinna, R. Douglas Martin and Victor J. Yobai, "Robust Statistics: Theory and Methonds," J. Wiley, 2006.
S. C. Chan, Z. F. Gan, K. T. Ng, K. L. Ho and H. Y. Shum, "An Object-based approach to image-based synthesis and processing for 3-D and multi view televisions," IEEE Trans Circuits Syst. Video Technology., vol. 19, No. 6, pp. 21-831, Jun. 2009.
G. A. Ruiz, and M. Granda, "Efficient canonic signed digit recoding", *Microelectronics Journal*, No. 42, pp. 1090-1097, 2011.
S.C. Chan, W. Liu and K. L. Ho, "Multiplierless Perfect Reconstruction Modulated Filter Banks with Sum-of-powers-of-two Coeffieients," IEEE Signal Processing Letter, vol. 8, pp. 163-166, 2001.
R.M. Gray, "Source Coding Theory," Kluwer Academic Publishers, 1990.
Steven Pigeon, "Huffman Coding". [Online] Available: http://www.stevenpigeon.com/Publications/publications/ HuffmanChapter.pdf.
iResearch Consulting Group, 2015. QI 2015 China Online Video Report (Brief Edition) [Online] Available: http://www.iresearchchina.com/views/6431.html.
3D Interface Specifications, White Paper, Philips 3D Solutions http://www.business-sites.philips.com/shared/assets/global/Downloadablefile/Philips-3D-Interface-White-Paper-13725.pdf.
C. Tomasi and R. Manduchi, "Bilateral filtering for gray and color images," IEEE Sixth International Conference on Computer Vision, pp. 839-846, 1998.
T. Matsuo, N. Fukushima and Y. Ishibashi, "Weighted Joint Bilateral Filtering with Slope Depth Compensation Filter for Depth Map Refinement," VISAPP(2), pp. 300-309, 2013.
International Search Report and Written Opinion in corresponding PCT Application No. PCT/CN2016/104887, dated Feb. 4, 2017.

* cited by examiner

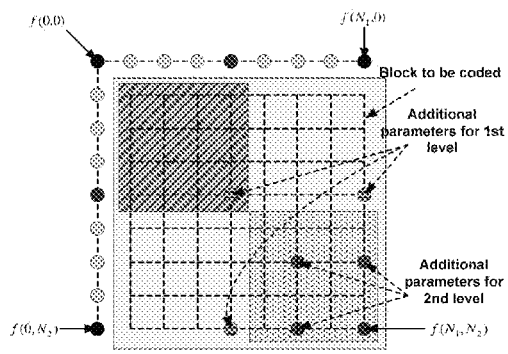
Fig. 13
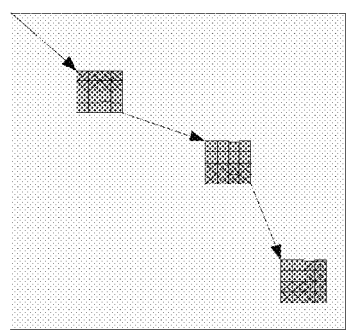
Nonzero coefficients
Fig. 14(a)
Nonzero subblock of residuals
Fig. 14(b)
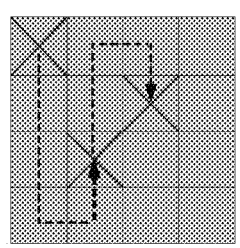
Fig. 14(c)

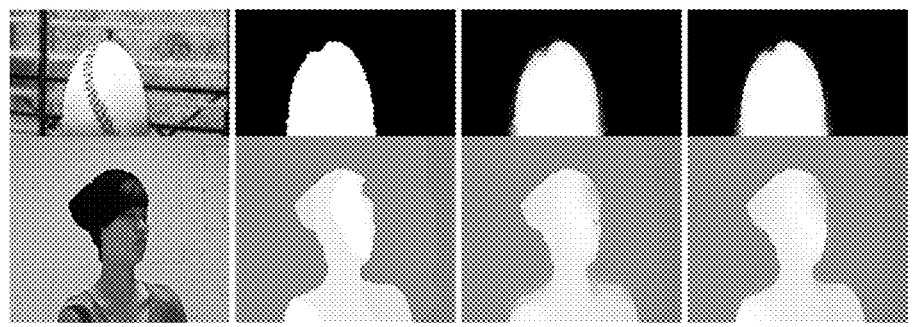
Fig. 19(a)  Fig. 19(b)  Fig. 19(c)  Fig. 19(d)
 
Fig. 20(a)　　　　　　　Fig. 20(b)

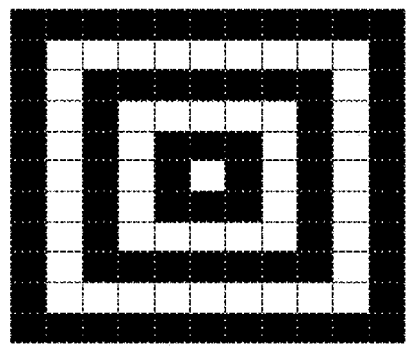 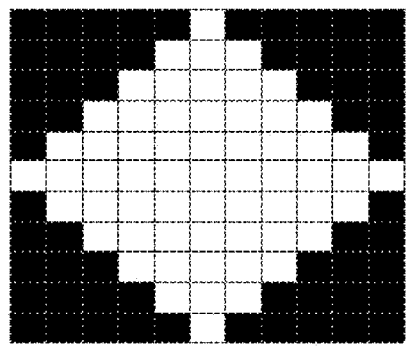
Fig. 21(a)             Fig. 21(b)
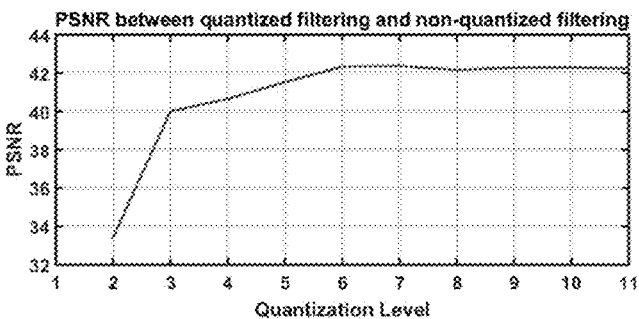
Fig. 22(a)
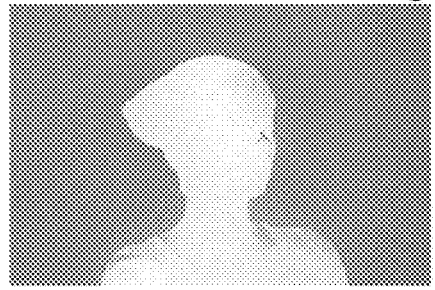 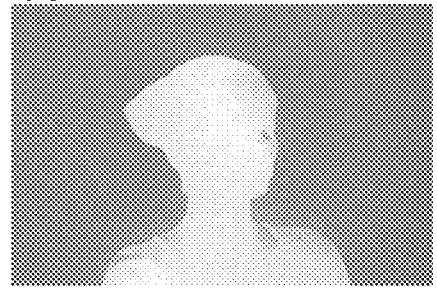
Fig. 22(b)             Fig. 22(c)

AUXILIARY DATA FOR ARTIFACTS—AWARE VIEW SYNTHESIS

CROSS-REFERENCE TO RELATED PATENT APPLICATIONS

This application claims the benefit of U.S. Provisional Application No. 62/285,825 filed Nov. 9, 2015, which is incorporated herein by reference in its entirety.

FIELD OF THE INVENTION

The present invention relates to the improved rendering of three-dimensional images based on two dimensional texture images, as well as auxiliary data.

BACKGROUND OF THE INVENTION

Most of the visual content today is still in the form of two dimensional (2D) images or videos, which are in the form of a sequence of 2D images. Generally, these conventional images and videos do not support a change in the vantage or viewpoint of the observer, other than just magnification/scaling or simple shifting. However, new display technology is becoming more available that provides stereo or three dimensional (3D) images. These are achieved generally with either active shutter or passive polarized eye glasses.

Also, more recently high resolution autostereoscopic displays, which do not require eye glasses, are becoming more available. The input to such autostereoscopic displays is typically i) a video image plus a depth map which describes the depth of each pixel in the video or ii) a set of videos at adjacent viewpoints, sometimes called a multi-view video, wherein the adjacent views are multiplexed onto an image frame in a certain format. A lenticular lens or parallax barriers of the autostereoscopic displays perform a spatial filtering so that a user at a certain viewing position will be able to see two different images in his/her left and right eyes respectively, thus creating 3D perception.

To display conventional 2D images or videos in a 3D display requires the generation of another view of the scene. On the other hand, the display of 3D videos on autostereoscopic displays requires either the generation of a depth map or the creation of appropriate multi-view videos that are to be multiplexed into the desired frame format.

One method to facilitate the generation of these additional views is to augment the videos with corresponding depth maps or their approximated versions. Depth maps are images (or videos if taken at regular time intervals) that record the distances of observable scene points from the optical point of a camera. They provide additional information to the associated color pixels in the color image or video taken at the same position by specifying their depths in the scene. One application of depth maps is to synthesize new views of the scene from the color image or videos (also referred to as texture). Depth maps can also be taken at adjacent spatial locations to form multi-view depth images or videos. Together with the texture or color videos, new virtual views around the imaging locations can be synthesized. See, S. C. Chan et al., "Image-based rendering and synthesis," *IEEE Signal Processing Magazine*, vol. 24, pp. 22-33, (2007) and S. C. Chan and Z. F. Gan et al., "An object-based approach to image-based synthesis and processing for 3-D and multiview televisions," *IEEE Trans. Circuits Syst. Video Technology*., vol. 19, no. 6, pp. 821-831, (June 2009), which are incorporated herein by reference in their entirety. These synthesized views, if appropriately generated, can support the display of the content in conventional 2D, stereo or autostereoscopic displays and provide limited view point changes.

For conventional videos, augmenting each image frame with a depth map results in an additional depth video and the format is sometimes referred to as the 2D plus depth representation. How the video and depth are put together leads to different formats. In the white paper, 3D Interface Specifications, Philips 3D Solutions, http://www.business-sites.philips.com/shared/assets/global/Downloadablefile/Philips-3D-Interface-White-Paper-13725.pdf, the 2D plus depth format packs the video and depth image side by side together in a frame as a physical input interface to the autostereoscopic displays. There is an extended version called "WOWvx declipse" format where the input frame is further split into four quadrants with two additional subframes storing the background occluded by the foreground objects and its depth values, respectively. There is no shape information and hence it is likely to rely on an accurate depth map to locate the boundaries of the foreground objects so that the occluded areas can be filled in during rendering. This may be prone to errors due to acquiring or compression of the depth map. Also the whole occluded background of the objects is required, which is usually unnecessary as the number of occlusion areas depends on the depth and the maximum viewing range. Usually, only the important objects with large depth discontinuities are required to be occluded and the minor occlusion can be handled by "inpainting." Inpainting (also known as image interpolation or video interpolation) refers to the application of sophisticated algorithms to replace lost or corrupted parts of the image data (mainly replacing small regions or removing small defects). The most significant limitation of this representation is that it can't handle semi-transparent objects as objects, or backgrounds are assumed to be fully occluded. The four-quadrant representation also significantly limits the resolution of all of the principal video and depth. Here, the 2D plus depth format or representation refers to the use of both video plus depth for view synthesis and is not limited to the physical format used in the Philips White Paper.

For 3D videos, each video in the stereo video can be augmented with a depth video. In HEVC-3D, two or more videos are coded together with their respective depth maps. See, G. Tech et al., "3D-HEVC draft text 1," *Proceedings of the 5th Meeting of Joint Collaborative Team on 3D Video Coding Extensions* (JCT-3V), Document JCT3V-E1001, Vienna, Austria, August 2013), which is incorporated herein by reference in its entirety. The main motivation for using such a multiple video-plus-depth format is to synthesize new views from two adjacent video-plus-depth videos. The videos and depths have to be compressed and decompressed using the HEVC-3D codec. Videos coded in other formats have to be transcoded together with the depth map to the new HEVC-3D format. One of the applications for view synthesis functionality is to generate multiple views for supporting autostereoscopic displays which generally require 5 or even a larger number of views.

Currently, there are two important problems in such applications, i.e., (1) texture and depth consistency at depth discontinuities, and (2) artifacts from inpainting dis-occluded areas.

The quality of view synthesis using multiple videos and depth maps is highly dependent on the quality of the depth maps. Inaccurate alignment of depth discontinuities between views and inconsistency between the texture and depth discontinuities usually yield severe rendering artifacts around object boundaries. The accuracy required to avoid these difficulties is generally difficult to achieve due to the limited accuracy of depth maps and the distortion introduced after data compression. The consistency of texture and depth discontinuities is also crucial to general 2D plus depth representation since significant artifacts will result if they are not properly handled.

Artifacts can arise from inpainting dis-occluded areas and the image-plus-depth representation during view synthesis. Due to dis-occlusion, holes will appear when the new view is generated from the texture and depth map at shape depth discontinuities. The conventional method to address this problem is to inpaint the holes from neighboring pixels. Though the WOWvx declipse format provides the occlusion data at the physical level, it is unsuitable for transmission and storage where bandwidth or storage is limited. The occlusion data are generally larger than the required view point change. Since it does not have precise shape information, its use will rely heavily on the depth map, which may be subjected to estimation error or compression errors for natural videos. Also, it does not support multiple views and semi-transparent objects. For stereo videos, data have to be appropriately extracted from the other views to inpaint these holes in real-time.

Sometimes, sophisticated inpainting algorithms or even human intervention have to be performed to reduce rendering artifacts. This is due to i) the view point change between the two views, ii) complicated dis-occluded background, and iii) inconsistency between depth and color videos especially at significant depth discontinuities and other reasons. Sophisticated inpainting makes real-time and reliable view synthesis with low artifacts extremely difficult. Moreover, the mismatch in color, edge locations and depth discontinuities of the two views will result in significant ghosting or "double images."

SUMMARY OF THE INVENTION

The present invention relates to the generation and compression of Auxiliary Data, which includes possibly major depth discontinuities in the form of shape images, partial occlusion data, associated tuned and control parameters, and depth information of original video(s). The auxiliary data is used for facilitating the interactive display and generation of new views of conventional 2D, stereo, multi-view videos in 2D, 3D and autostereoscopic (multi-view) displays with reduced artifacts. The shape image aims to specify objects with significant depth discontinuities where further processing, such as maintaining depth-texture consistency and filling in the required partially occluded background data for view synthesis, is performed. The occlusion can be full occlusion or partial as in semi-transparent objects.

Since the data is associated with the disocclusion areas, which is due to the occlusion in another view, they are also referred to as disocclusion data. Therefore, the terms occlusion and disocclusion are used interchangeably herein in referring to these data.

To address the artifacts due to inaccurate depth maps in other locations, and the difficult problem of rendering using video-plus-depth videos at two views, the present invention provides a novel artifacts-aware method for view synthesis. Together with the advantages and features mentioned above due to the two major components in the auxiliary data, shape image and partial occlusion data, artifacts can be greatly reduced or made less noticeable.

The artifacts-aware view synthesis (AAVS) method of the present invention is based on the fact that human 3D perception, like the auditory system, is able to tolerate considerable deformation of the left and right eye images without significantly impairing the overall 3D perception and quality. On the other hand, artifacts which lead to a significant deviation from a natural image, such as ghosting, significant local deformation, holes or structural inconsistency, will lead to significant degradation of the overall perception quality.

It is also observed in experiments that new views synthesized using a 2D plus depth and the auxiliary data method are usually closer to natural images than using two views with less accurate depth maps. By exploring the human 3D perception and the above fact, the views required by the stereo or autostereoscopic displays corresponding to the left (right) eye are synthesized using the left (right) stereo videos and the proposed 2D plus depth with auxiliary data synthesis method. Significantly fewer visual artifacts are obtained using this approach than using the stereo views to synthesize all the required views. If only one video and its associated depth video are available, then all the required views can be synthesized using the 2D plus depth and the auxiliary data method. Again, few visual artifacts and lower bandwidth/storage can be obtained at the expense of degraded 3D effect.

The 2D plus depth and the auxiliary data method is also suitable for supporting interactive view point change and magnification over a certain range. For stereo videos plus associated depth videos, supporting view point change in conventional 2D displays from one view to the other, significant artifacts will occur if the depth discontinuities, etc., are not aligned. Using the new method, however, will result in a jump from the view generated by one of the original images to the other around the mid-point between the left and right viewpoints.

To overcome this undesirable effect, a new morphing method is performed to emulate a fly-over effect from one view to the other. Instead of using a conventional morphing method, both views are used to synthesize the required views in a selectable region around the mid-point to emulate the morphing process. The size of this region and the sweeping rate are determined by certain measurements of artifacts in terms of the agreement of the two views to being combined. The larger the artifacts measured, the lower will be the synthesis quality and the faster will be the sweeping rate in the region. Thus, the visual artifacts are effectively suppressed by the morphing and fly-over process.

The present invention proposes the use of the original or compressed Auxiliary Data, including possibly major depth discontinuities in the form of shape images, partial occlusion data, associated tuned and control parameters, and depth information of the original video(s) to facilitate the interactive display and generation of new views (view synthesis) of conventional 2D, stereo, and multi-view videos in conventional 2D, 3D (stereo) and multi-view or autostereoscopic displays with reduced artifacts. The partial (which also includes fully occlusion) occlusion data includes image, depth and opacity data of possibly partially occluded areas to facilitate the view synthesis having reduced artifacts. The invention further encompasses an efficient method for extracting objects at partially occluded regions as defined by the auxiliary data from the texture videos to facilitate view synthesis with reduced artifacts, and a method for updating the image background and the depth values using the auxiliary data after extraction of each object to reduce the artifacts due to limited performance of online inpainting of missing data or holes during view synthesis. Further, the invention provides (a) a method for compression/decompression of the partial occlusion data, (b) a joint spatial-temporal edge-aware depth-texture refinement method and its efficient implementation for improving the consistency of possibly coded (compressed) depth and texture videos to reduce artifacts during view synthesis, and (c) an artifacts-aware method for generating new views (also called view synthesis) using the auxiliary data and the videos with reduced or less noticeable artifacts.

The auxiliary data can be packed, compressed, transmitted or stored in a certain format. The decompressed data can be used together with the associated video(s) to generate new views (view synthesis) using the methods in (a) to (c) above from conventional 2D, stereo, and multi-view videos for their interactive display in conventional 2D, 3D (stereo) and multi-view or autostereoscopic displays with reduced artifacts.

The videos can be compressed independent of the auxiliary data so that the auxiliary data can work with the software and/or hardware of different video coding algorithms by utilizing only its decoded video frame(s) for further processing and rendering. Alternatively, if higher compression performance is required, the compression of the auxiliary data can be targeted to the videos compression algorithm, while sacrificing the possibility of supporting other video coding algorithms.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The foregoing and other objects and advantages of the present invention will become more apparent when considered in connection with the following detailed description and appended drawings in which like designations denote like elements in the various views.

FIGS. 1(a) to 1(c) show the inconsistency of a texture image and a disparity map, wherein FIG. 1(a) is the texture image, FIG. 1(b) is the disparity map and FIG. 1(c) shows the inconsistency;

FIG. 13 shows a hierarchical bilinear intra-prediction diagram;

FIGS. 14(a) and 14(b) show chain code and arithmetic coding methods, respectively for coding the location of sub-blocks with non-zero quantized coefficients, and FIG. 14(c) illustrates scanning of nonzero quantized coefficients inside a sub-block;

FIG. 19(a) is a color image; FIG. 19(b) is an original disparity map; FIG. 19(c) is a refined disparity map filtered by a conventional bilateral filter, and FIG. 19(d) is a refined disparity map filtered by the improved method of the present invention;

FIG. 20(a) shows disparity maps before refinement and FIG. 20(b) shows disparity maps after refinement;

FIG. 21(a) illustrating a first example and FIG. 21(b) illustrating a second example;

FIG. 22(a) is a graph of the peak signal to noise ratio as a function of the level of quantized filtering, and FIGS. 22 (b) and 22(c) are an image of the original filtering result and the quantized filtering result, respectively;

DETAILED DESCRIPTION OF EXEMPLARY EMBODIMENTS OF THE INVENTION

Figures 1A, 1B, 1C:
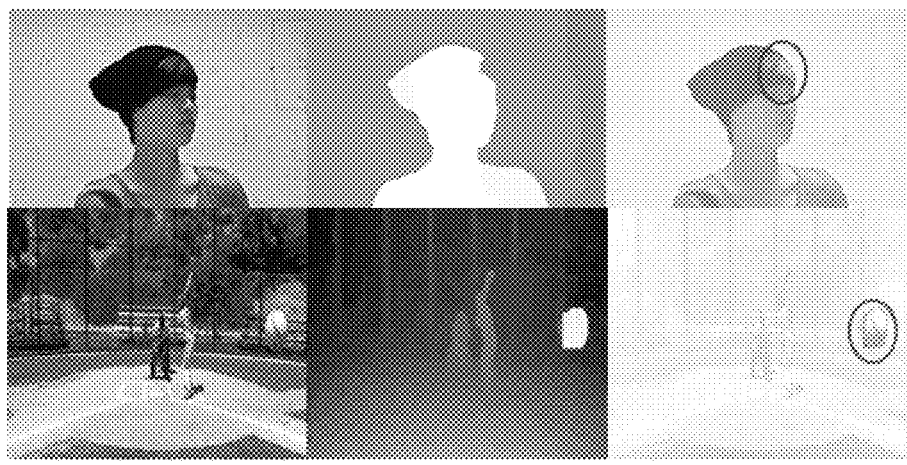

FIGS. 1 (a), (b) and (c) show examples of a texture image, its corresponding disparity maps, and the overlay of the two. From FIG. 1 (c), it can be found that some areas, marked by red circles, are not perfectly aligned. Because a depth map obtained by depth cameras, stereo estimation or other methods may be subject to errors, they may not be aligned with the corresponding texture images. These mismatches are mostly distributed around the object boundaries because current disparity estimation methods or depth cameras cannot perfectly handle occlusions around object boundaries.

Other sources of errors are due to the compression errors of the texture and depth videos. When the depth map and texture are compressed, the depth and texture videos may be subject to distortion. This may result in considerable inconsistency between depth and texture. This inconsistency will in turn result in noticeable artifacts in generating new views from the depth and the corresponding texture at major depth discontinuities, as pixels in the background may move to the foreground due to the incorrect depth values and vice versa.

In conventional view synthesis using depth maps as in the G. Tech article, the decompressed depth map is used to detect occlusion or dis-occlusion for rendering. The coding distortion or other inherent errors in the depth map will therefore significantly affect the quality of new view synthesized, leading to the artifacts mentioned above.

Figures 2A, 2B:
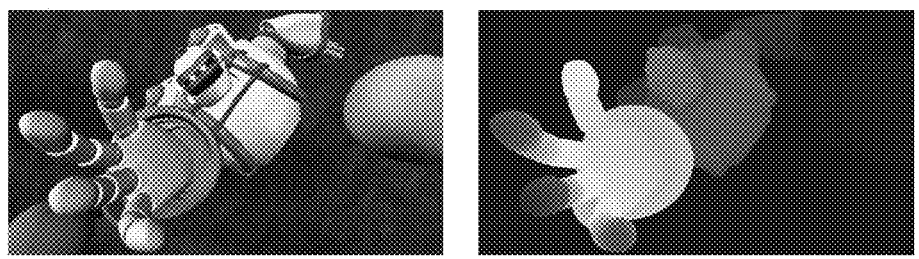
FIG. 2(a) shows a 2D input image and FIG. 2(b) shows a corresponding depth map.

In the proposed invention, major discontinuities are also included and compressed as part of the auxiliary data together with the video and depth data as shown in FIG. 2, where FIG. 2(a) is the image and FIG. 2(b) is the depth map. In FIG. 2(b) the color blue indicates a large depth value; yellow indicates a middle depth value and red a small depth value. The discontinuities are represented in form of shape images (FIG. 3), each of which is an image indicating the amount of the foreground and background defined by the major discontinuities. This is also called a matte or soft segmentation image, which is frequently used to define the amount of foreground at a particular pixel location in blue screen technique. It can be an 8-bit image with a value ranging from 0 to 255, which indicates the soft membership or opacity of this pixel with 0 having no contribution (i.e. transparent) and 255 having full contribution (i.e. completely seen). If only the geometric shape of the object is needed, then the shape image can be simplified to a binary image with pixels assuming a value of 0 or 1. The latter is of interest in data compression when the available bit rate is limited. To support semi-transparent objects in a binary shape image, the proposed invention also includes the mean opacity of the object. The exact opacity at the boundary will be estimated from input and other essential information of the auxiliary data. In general, more simplification of the opacity can be included in the case of a binary shape image.

In this invention, the shape image is used to refine the texture and depth maps at the major discontinuities to improve their consistency arising from compression or other errors. In conventional 2D plus depth-based view synthesis, the color input is transformed according to the depth map to form another adjacent view. Due to disocclusions, holes appear which are inpainted or interpolated from neighboring pixel values. When the view point change is increased, considerable artifacts will appear due to the missing disocclusion data.

According to the present invention, the shape information is used to indicate the major disocclusion areas and the missing information required to support the given view point change, which is called the "partial occlusion data." The partial occlusion data is included with the image data, depth data and matte, and they are packed together with the shape information, depth map of the input image/video and other control and tuned parameters to assist view synthesis, etc. to form the auxiliary data. The above information will be compressed to reduce transmission bandwidth and data for storage.

Another possible application of the present invention is in some 2D to 3D converted stereo videos, where simple image deformation, instead of depth maps, are used to synthesize the other views from the 2D video. The inclusion of auxiliary data allows certain important objects to reveal better 3D effects by sharpening the smooth depth map and inclusion of partial occlusion data.

The auxiliary data can be embedded in the video data for transmission or be transmitted as a separate data stream like the audio data in a synchronized manner. By using the decoded video data and the corresponding decoded auxiliary data, new views can be synthesized with reduced artifacts. To this end, the locations of disocclusion/occlusion areas need to be estimated, and the image, depth and matte data needs to be generated. For multi-view videos, such data can be obtained from the estimated depth map and appropriate extraction from adjacent images. Holes are further inpainted by various available inpainting methods. Alternatively, semi-automatic techniques with user interaction can be used to ensure good inpainting quality.

The image, depth and matte data can then be compressed by conventional waveform coding techniques such as transform coding using the discrete cosine transform (DCT). However, a new intra-prediction method as described below can also be used.

For synthesis of new views, there are generally two approaches, a scan line-based method and a layer-based method. With the scan line method it should be noted that the color image is wrapped line by line in a raster scan order according to the depth map. The conventional techniques used in the G. Tech article can be used to detect the disocclusion from the significant widening of an interval. Then interpolation can be relied upon to fill in the disocclusion areas. For a noisy depth map, significant artifacts in the form of irregular line segments at adjacent scan lines will occur.

With the shape information, the disocclusion areas can be estimated and the image data at the disocclusion areas can be filled in according to their own depth. The sizes of holes to be filled are significantly reduced and consistency across adjacent scan lines can be better enforced using the shape information.

With the layer-based method, if graphic processing units (GPU) are used, then it is convenient to reconstruct the inpainted objects into image layers having their own depth maps. Then the layers can be rendered one after the other in descending order of their depth values.

To form the inpainted objects, each specified object is extracted from the original image and inpainted with the appropriate disocclusion data in a certain order. A new artifacts-aware view synthesis algorithm for supporting the display of this content in conventional 2D, stereo, and autostereoscopic displays is described subsequently.

Figure 4:
FIG. 4(a) is the background arising from occlusion due to objects 1 and 2 of FIG. 3
FIG. 4(b) shows the occlusion at object 2 of FIG. 3 arising from occlusion due to object 1 of FIG. 2.

FIG. 4 and FIG. 5 show respectively the image and depth data in the partial disocclusion data for the background and an object 1 obtained from a computer graphics generated videos. The original videos have three views, which are used to generate the partial occlusion data for the first view on the left.

Figure 4B:
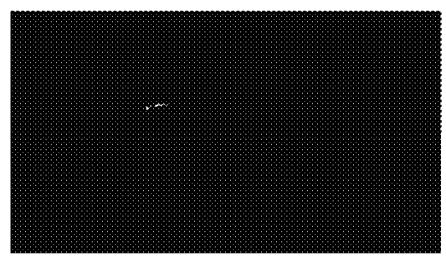

In FIG. 4, image data of the partial occlusion data is shown on the left in FIG. 4(a) as the background arising from occlusion due to objects 1 and 2. FIG. 4(b) on the right shows occlusion at object 2 arising from occlusion due to object 1. In FIG. 4 it is assumed that the left view is used to synthesize the right view. However, it is possible to use the right view to synthesize the left view and the partial occlusion data will appear around the right boundaries of the shape image.

Figure 5A:
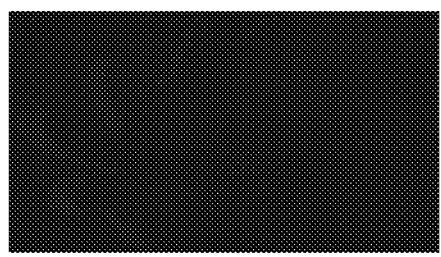
FIG. 5(a) is the background arising from occlusion due to objects 1 and 2.
Figure 5B:
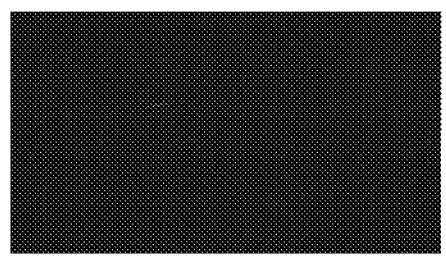
FIG. 5(b) is the occlusion at the object 2 arising from occlusion due to object 1.

FIG. 5 shows the depth data of the partial occlusion data on the left in FIG. 5(a) as the background arising from occlusion due to objects 1 and 2 and on the right in FIG. 5(b) as object 2 arising from occlusion due to object 1.

Using the first view and these required auxiliary data, intermediate views can be obtained. For stereo videos, the disocclusion information may be estimated from the stereo data and the holes can be inpainted using sophisticated inpainting techniques. The inclusion of such information in the auxiliary data helps to reduce the real-time generation of such data. Moreover, human intervention can be invoked through a semi-automatic user interface to ensure that the quality of the disocclusion information and hence the quality of the view synthesis, is maintained.

The present invention is different from conventional image-based rendering where multiple views are usually used to generate the intermediate views by appropriately combining the data from two or more views. Here, a conventional video is used together with the auxiliary data, which contains the depth map, shape image, disocclusion information and other control or tuning parameters to synthesis the new views. The representation is more compact at the expense of limited view dependent appearance changes. Moreover, it is more like a conventional video or stereo, which, when equipped with an additional channel or stream of auxiliary data, is able to support view synthesis and morphing.

Due to the small amount of information required for such auxiliary data, view synthesis of conventional videos or stereos on handheld or mobile devices can be considerably simplified.

In summary, the auxiliary data in this invention consists of the following information:
1. Shape images with an identifier for indicating the depth order of each view.
2. Depth map of each 2D video.
3. Partial Occlusion Data, which include i) the image, matte and depth data of the partial occlusion specified by the shape and depth map of each object in each view, and ii) image, matte and depth data of the self-occlusion data.
4. Other control or tuned parameters required in the algorithms in performing the object extractions, update of background, joint depth-texture filtering and view synthesis.

An important feature of the present invention is the efficient extraction of foreground and updating of background from shape images and/or partial occlusion image data.

Due to compression, the shape images or matte may be slightly distorted after compression. However, they can still provide valuable information as to where correction of the depth and texture is required to maintain consistency. Consequently, the correction can be performed only along the important depth discontinuities as specified by the shape image, resulting in lower complexity.

Moreover, this allows the specified foreground object to be extracted from its background so that the occluded background can be filled with the color and depth images of the partial occlusion data in the auxiliary data. If the depth information is unavailable due to bandwidth limitation, their depth values can be obtained from neighboring background depth values as depth maps are assumed to be smooth when they are far from the depth discontinuities.

Therefore, the following steps are followed in order to perform view synthesis using an image frame and its corresponding auxiliary data:
1 extract the image objects and their depth values at partially occluded regions as defined by the auxiliary data from the texture and depth videos;
2 update the image background and its depth values using the auxiliary data after extraction of each object; and
3 use the objects extracted at the specified partial occlusion regions and the background to perform view synthesis.

To further reduce the artifacts in view synthesis, the depth-aware view synthesis method of the present invention can be employed, as will be further elaborated upon subsequently.

Turning to step 1, i.e., the extraction of image objects and associated depths, the relationship needs to be developed.

Let $\alpha_p$ be the amount of foreground of the pixel at location p=(x,y) of the texture image $\{I_p\}$. For notation simplicity, the two dimensional array of the texture image is indexed using p. $I_p$ is a vector which contains the appropriate color components such as the RGB components. The corresponding depth image, which describes the depth value of the pixel at p, is denoted by $D_p$.

The shape information in the auxiliary data, $\hat{\alpha}_p$, provides the approximate location of the depth discontinuities for correction. In the case of a gray scale shape image (say 8-bit matte image), it also provides the approximate amount of foreground at these locations, ranging from 0 to 1 (or between 0 and 255, if it is stored in 8-bits). For fully occluded objects, the simplest shape information can be a binary image and its pixels will only assume the values 0 or 1. For partially occluded objects, the simplest shape information can be a binary image plus the mean opacity value $\bar{\alpha}$.

As mentioned, the goals in this step are to i) refine the shape information in the region suggested by $\hat{\alpha}_p$ and extract the foreground object(s) and ii) update the background in this region for each object in preparation for view synthesis. Both the texture and depth values have to be refined to improve consistency.

For instance, in case of a binary shape image, edge detection or similar techniques can be used to obtain an object shape from the shape image as shown in FIG. 3. The region around the object boundary, say pixels within a maximum distance $d_{max}$ from the object boundary, should be refined to correct for the various errors. Let this region be R, which can be specified by the user by including $d_{max}$ as part of the shape information in the auxiliary data.

The region R can be extracted from the input image for instance by performing morphological dilating and eroding independently on the binary shape image with a radius $d_{max}$ (depending on the quality of disparity map or the inconsistency between information) and perform an "exclusive or" operation on them.

Generally, multiple shape images may be present in an image frame. If they exist, their association with the objects, i.e. association labels, must be specified. If they do not overlap, then the above process can be performed separately. If multiple shape images overlap, then their order of extraction and updating must be specified, usually in ascending order of the depth in the overlap, when they are coded in the auxiliary data. Normally, only a few shape images are required and most often only the shape image of the closest object in the scene is required as its depth discontinuities are most important.

Starting from the one with the smallest depth, the extraction and updating of the background from the 2D video with the help of the auxiliary data is performed sequentially in the following steps:

1. use the shape image to extract the foreground from the background using matting, which will be further elaborated upon below;
2. fill in the image data at the disocclusion area of the remaining background by matting at the boundary of the partial occlusion data. Except at this boundary, all pixels covered by the partial occlusion data in the remaining background will be over written to remove the trace of foreground in the updated background. Additional inpainting may be required to fill in possible holes;
3. update the depth of the new background from the partial occlusion data. Inpainting may be required to fill in the holes within the boundary defined by the object with the next smallest depth until all objects are processed; and
4. repeat steps 1 to 3 above for the next object with the smallest depth. When matting at a boundary region without any color and depth data, the shape image will be used as the refined shape.

To further carry out step 1, the extraction of a given image object (Current Foreground) by matting is the next requirement.

For a pixel at location p in a region R around the object boundary (say within a certain distance $d_{max}$ indicated by the corresponding shape image), the observed texture input image vector $I_p$ is a sum of the current foreground object texture $F_p$ and the background texture $B_p$ to be extracted:

$$I_p = \alpha_p F_p + (1-\alpha_p) B_p \quad (1)$$

where $\alpha_p$ is the desired amount of foreground or matte to be determined at location p. Here, it is assumed that they are a column vector.

For a semi-transparent object, an initial value of $\alpha_p$, $\overline{\alpha}_p$, and the background $B_p$ is available from the partial occlusion data. Then the boundary region R may include the boundary and all of the partial occluded objects. In general, the problem is then to refine existing values and estimate the unknown values from the observations and additional information from the partial occlusion data so that the color, depth and shape information of each specified object can be determined.

Conventionally, the problem of determining $\alpha_p$, $F_p$, and $B_p$ from a user specified region R, usually through a user interface, for image segmentation is called matting. This is an under-determined problem and various techniques which made use of additional information have been proposed in Y. Chuang et al., "A Bayesian approach to digital matting," *Proc. IEEE Comput. Soc. Conf. CVPR*, (December 2001), vol. II, pp. 264-271; M. Ng et al., "Numerical Methods for Interactive Multiple Class Image Segmentation Problems," *International Journal of Imaging Systems and Technology*, 20 (2010), pp. 191-201; and X. Kong et al., "Transductive Multi-Label Learning via Alpha Matting," *IEEE Transactions on Knowledge and Data Engineering*, vol. 25, pp. 704-719, (2013), which are incorporated herein by reference in their entirety.

Next, the refinement problem must be addressed where an approximated matte is available due to compression or other limitations in the full occlusion case and the approximated matte and background are available in the semi-transparent case.

In Bayesian matting, $F_p$, and $B_p$ are assumed to be Gaussian distributed with known means ($\overline{F}_p$ and $\overline{B}_p$) and co-variances ($\Sigma_F$ and $\Sigma_B$):

$$F_p \propto \exp(-\tfrac{1}{2}(F_p - \overline{F}_p)^T \Sigma_F^{-1} (F_p - \overline{F}_p)), \text{ and}$$

$$B_p \propto \exp(-\tfrac{1}{2}(B_p - \overline{B}_p)^T \Sigma_B^{-1} (B_p - \overline{B}_p)),$$

where $\alpha_p$, $F_p$, and $B_p$ are solved iteratively by solving in each iteration firstly $F_p$ and $B_p$ given $\alpha_p$ and then $\alpha_p$ given the updated $F_p$ and $B_p$. Since a number of such iterations are required and it is required to solve a system of linear equations in $F_p$ and $B_p$ at each such iteration, the complexity is high for real-time applications.

Bayesian matting as disclosed in the Y. Chuang article explores the observation in Equation (1) and the prior information of the sample means $\overline{F}_p$ and $\overline{B}_p$, and their co-variances in order to solve for $F_p$, $B_p$ and $\alpha_p$ iteratively. Since $F_p$ ($B_p$) is part of the original image $I_p$, adjacent pixel values of $F_p$, like $I_p$, are related or correlated due to the structure of natural images. Therefore, $\overline{F}_p$ ($\overline{B}_p$) can be viewed as a predictor of $F_p$ ($B_p$) from its neighboring pixels. In general, a more general predictor, such as a median, can be constructed. Also, the relationship between neighboring values of $\alpha_p$ is not explored.

In the transductive multi-label learning (TRAM) as disclosed in the M. Ng and X. Kong articles, the correlation between neighboring values of $\alpha_p$ is explored for semi-automatic image segmentation. Users are required to specify, through users' strokes, representative pixels in the foreground and background so that the TRAM algorithm can be used to estimate the matte or segmentation of the entire image. This requires the solution of a system of linear equations in all the variables $\alpha_p$, $p \in R$. Therefore, the complexity is huge. Unlike Bayesian matting, TRAM does not take the mixing model of Equation (1) into account and relies solely on the user initialization and the image to obtain the segmentation.

The present invention proposes a novel method for predicting $\overline{F}_p$ and $\overline{B}_p$ inside the region R using the estimates of $F_p$ and $B_p$ so that $\alpha_p$ can be computed directly using a new Bayesian formulation without solving the linear system of equations as mentioned above. If necessary, $\alpha_p$ can be further refined from its neighboring values by exploring the local relationship in $\alpha_p$. As shown below, the two steps in estimating the initial $F_p$ and $B_p$, and refining $\alpha_p$ can be implemented efficiently as two filtering processes, which can further be implemented without multiplications using the canonical sign digits (CSD) representation of the filter coefficients as disclosed in the article G. A. Ruiz et al., "Efficient canonic signed digit recoding," *Microelectronics Journal*, No. 42, pp. 1090-1097, (2011), which is incorporated herein by reference in its entirety. The entire process can be made iterative to further refine the estimation results, if necessary.

According to the present invention, it is noted that all $F_p$, $B_p$ and $\alpha_p$ are related to their neighboring values according to $$\hat{F}_p = \frac{1}{S_p^{(F)}} \sum_{j \neq p \in W_p^{(F)}} s_{p,j}^{(F)} \cdot F_j, \, S_p^{(F)} = \sum_{j \neq p \in W_p^{(F)}} s_{p,j}^{(F)}. \quad (2a)$$

$$\hat{B}_p = \frac{1}{S_p^{(B)}} \sum_{j \neq p \in W_p^{(B)}} s_{p,j}^{(B)} \cdot B_j, \, S_p^{(B)} = \sum_{j \neq p \in W_p^{(B)}} s_{p,j}^{(B)}. \quad (2b)$$

$$\hat{\alpha}_p = \frac{1}{S_p^{(\alpha)}} \sum_{j \neq p \in W_p^{(\alpha)}} s_{p,j}^{(\alpha)} \cdot \alpha_j, \, S_p^{(\alpha)} = \sum_{j \neq p \in W_p^{(B)}} s_{p,j}^{(\alpha)}. \quad (2c)$$

The weights $s_{p,j}^{(F)}$, $s_{p,j}^{(B)}$, and $s_{p,j}^{(\alpha)}$ can be derived from the spatial distance between pixels j and p, the color values at or around j and p and the depth values at or around j and p. $W_p^{(F)}$, $W_p^{(B)}$, and $W_p^{(\alpha)}$ are appropriate windows which contain the neighboring pixels for prediction.

The usefulness of Equations (2a) and (2b) is that they can help to predict the values of $F_p$ and $B_p$ in the boundary region R progressively from existing or predicted values. This is similar to inpainting, where the foreground (background) values on one side of R are gradually propagated from the existing pixels to fill in the nearest missing values in R in a certain order using Equations (2a), (2b), where $W_p^{(F)}$, ($W_p^{(B)}$) contains only those locations with either known or predicted values. Equation (2c) can be used to refine the estimated $\alpha_j$ at given the estimated $F_p$ and $B_p$.

Consider now the estimation of $\alpha_j$ and estimation/prediction of $F_p$ and $B_p$ in turn. Given $F_p$, $B_p$ and the prior value of $\alpha_p$, $\overline{\alpha}_p$, $\alpha_p$ can be solved from Equation (1) by minimizing some measure of the model error $e_p = I_p - \{\alpha_p F_p + (1-\alpha_p) B_p\}$ and the deviation from $\overline{\alpha}_p$ with respect to $\alpha_p$ $$E_\alpha(\alpha_p) = \rho(e_p) + \lambda \rho_\alpha(\alpha_p - \overline{\alpha}_p), \quad (3)$$

where $\rho(e_p)$ and $\rho_\alpha(\alpha_p - \overline{\alpha}_p)$ measure respectively the deviation from the mixing model in Equation (1) and the prior value of $\overline{\alpha}_p$, and $\lambda$ is a user chosen positive constant which puts different emphasis on the two terms. Possible choices of $\rho(e_p)$ are $\|e_p\|_2^2$ or $\|e_p\|_1 = \sum_{i=1}^3 |e_{p,i}|$ ($e_{p,i}$, i=1,2,3 are the components of $e_p$) and other similar functions can be used. Possible choices of $\rho_\alpha(u)$ are $u^2$ or $|u|$, and other similar functions can also be used.

For the squared magnitude functions $\|e_p\|_2^2$ and $u^2$, one minimizes $$E_\alpha(\alpha_p) = \|I_p - \{\alpha_p F_p + (1-\alpha_p) B_p\}\|_2^2 + \lambda \|\alpha_p - \overline{\alpha}_p\|_2^2,$$

which yields $$\alpha_p = \frac{(I_p - B_p)^T (F_p - B_p) - \lambda \overline{\alpha}_p}{\|F_p - B_p\|_2^2 - \lambda}. \quad (4)$$

This provides an analytical formula for computing $\alpha_p$ given $F_p$, $B_p$ and $\alpha_p$. In extracting semi-transparent objects, $B_p$, $I_p$ and $\alpha_p$ are given and the $F_p$ needs to be extracted in the partial occluded region. Moreover, $\alpha_p$ may need to be refined at the object boundary using the above equation.

Now it must be determined how $F_p$ and $B_p$ can be estimated. To accomplish this a joint texture and depth method is described for in-painting the foreground and background in the matting area. First, in-painting in the foreground is considered with the weights $s_{p,j}^{(F)}$ in Equation (2a) chosen as $$s_{p,j}^{(F)} = f_c(I_p, F_j) \cdot f_d(D_p, D_j) \cdot f_s(p, j) \cdot M_j^{(F)} \quad (5)$$

where $$\hat{F}_p = \frac{1}{S_p^{(F)}} \sum_{j \neq p \in W_p^{(F)}} s_{p,j}^{(F)} \cdot F_j, \, S_p^{(F)} = \sum_{j \neq p \in W_p^{(F)}} s_{p,j}^{(F)} \cdot F_p$$

is the inpainted pixel value at location p to be in-painted and $F_j$ is the neighboring foreground pixel at location j in a window $W_p^{(F)}$ centered on p.

There are four major components in $s_{p,j}^{(F)}$, namely

1. $f_c(I_p, F_j)$ is the color similarity function between $I_p$ and $F_j$. The closer the values $I_p$ and $F_j$ are, the larger the value of $f_c(I_p, F_j)$ and vice versa. Any color similarity functions can be used and a simple choice is $f_c(I_p, F_j) = e^{-\|I_p - F_j\|_p^p / \sigma_\alpha}$, where c is a positive intensity spread parameter and $\|x\|_p^p = \sum_{i=1}^m |x_i|^p$ is the p-th power of the Lp norm of the vector $x = [x_1, \ldots, x_m]^T$. Common choices of p are p=1 and p=2.
2. $f_d(D_p, D_j)$ is the depth similarity function between $D_p$ and $D_j$. $D_p$ and $D_j$ are the depth values at location p and $D_j$ respectively. Any depth similarity function can be applied and a simple choice is $f_d(D_p, D_j) = e^{-\|D_p - D_j\|_p^p / \sigma_d}$, where $\sigma_d$ is the positive depth spread parameter.
3. $f_s(p,j)$ is the spatial distance weighting function. Again, there are many choices and a simple choice is $f_s(p,j) = e^{-\|p-j\|_p^p / \sigma_s}$, where $\sigma_s$ is a positive spatial spread parameter.
4. $M_j^{(F)}$ is a mask function which is equal to 1 when the pixel at location j is in the foreground and its color value is known, and zero otherwise.

The spread parameters $\sigma_c$ and $\sigma_d$ are related to the reliability of color and depth maps in making the inference. For instance, if the depth map is noisy, then $f_d(D_p, D_j)$ will be chosen to be one and can be omitted in some applications. The method is also applicable to matting applications where the depth map is usually unavailable.

Similarly, $s_{p,j}^{(B)}$ can be chosen as in Equation (5) as $$s_{p,j}^{(B)} = f_c(I_p, B_j) \cdot f_d(D_p, D_j) \cdot f_s(p,j) \cdot M_j^{(B)} \quad (6)$$

where $f_c(I_p, B_j)$ is the color similarity function between $I_p$ and $B_j$.

Using Equations (2a), (2b), (5) and (6), the given foreground and background pixels can be in-painted from the neighbors of the known foreground and background to the unknown regions gradually. A natural choice is to inpaint the pixels from the known pixels to unknown pixels one pixel after the other in a certain order. In some cases, to accelerate the inpainting, some pixels can be inpainted in parallel.

Figure 6A:
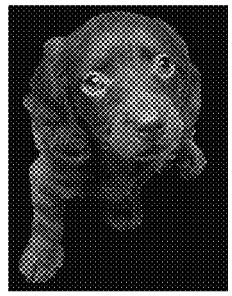
FIG. 6(a) shows the original foreground with dog 1.
Figure 6B:
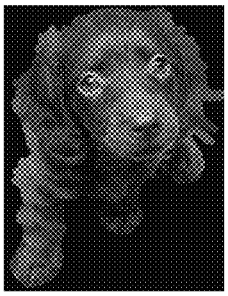
FIG. 6(b) shows the in-painted foreground at unknown areas of FIG. 6(a)
Figure 6C:
FIG. 6(c) shows the original background with dog 2 and FIG. 6(d) shows the in-painted back ground at unknown areas of FIG. 6(c)
Figure 6D:
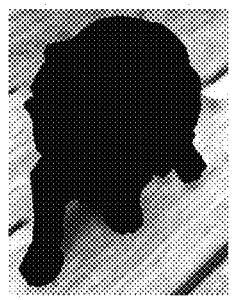

After a pixel, say at location p, is in-painted, its mask $M_p^{(F)}$ is set to 1 and its color value $F_p$ is set to $\hat{F}_p$. Examples of inpainted results are shown in FIG. 6 using a texture image only. FIG. 6(a) is the original foreground and FIG. 6(b) is the in-painted foreground at unknown areas for an image of a first dog. The background can be in-painted similarly and an example of an inpainted background is shown in FIG. 6 where FIG. 6(c) is the original background and FIG. 6(d) is the inpainted background. Notice the protrusions in the circle in FIG. 6(c) are gone in FIG. 6(d).

The advantage of this process is that it is unnecessary to solve the system of linear equations for $F_p$ and $B_p$ as in Bayesian matting. Instead, only the inpainting using Equations (2a), (2b), (5) and (6) needs to be performed. Other methods for updating $F_p$ and $B_p$ with $\overline{F}_p$ and $\overline{B}_p$ replaced by the computed or other predicted values can also be used. For example, one can minimize the objective function $$E(F_p, B_p) = \rho(e_p) + \lambda_F \rho_F(F_p - \overline{F}_p) + \pi_B \rho_B(B_p - \overline{B}_p), \quad (7)$$

where $\rho_F(F_e)$ and $\rho_B(B_e)$ measure, respectively, the deviation from $\overline{F}_p$ and $\overline{B}_p$, and $\lambda_F$ and $\lambda_B$ are positive constants for putting different emphasis on the three terms. $\overline{F}_p$, $\overline{B}_p$, and $e_p$, of Equation (7) can be solved by solving a system of linear equations as in Bayesian matting.

Given the estimated values of $F_p$, $B_p$ and the prior values of $\alpha_p$, $\overline{\alpha}_p$, then $\alpha_p$ can be solved using Equation (4). The $\alpha_p$ so computed can be combined with the predictor from its neighbors and the value at p to obtain a more stable estimate. This yields $$\tilde{\alpha}_p = \beta\alpha_p + (1-\beta)\hat{\alpha}_p = \qquad (8)$$
$$\beta\alpha_p + \frac{1-\beta}{S_p^{(\alpha)}} \sum_{j \neq p \in W_p^{(\alpha)}} s_{p,j}^{(\alpha)} \cdot \alpha_j = \sum_{j \neq p \in W_p^{(\alpha)}} \tilde{s}_{p,j}^{(\alpha)} \cdot \alpha_j$$

where $$\tilde{s}_{p,j}^{(\alpha)} = \begin{cases} \frac{1-\beta}{S_p^{(\alpha)}} s_{p,j}^{(\alpha)} & j \neq p \\ \beta s_{p,j}^{(\alpha)} & j = p \end{cases} \cdot \beta$$

is a constant from 0 to 1 to balance the matting and filtering.

This is a filtering process, where the original or input matte $\alpha_j$ is modified by local weighted average through the weight $\tilde{s}_{p,j}^{(\alpha)}$ to obtain the new estimate or filter output $\tilde{\alpha}_p$. Such filtering helps to remove undesirable components in the input, which in this case helps to reduce the variance of $\alpha_p$ obtained from Equation (4).

Similar to $\tilde{s}_{p,j}^{(F)}$ and $\tilde{s}_{p,j}^{(B)}$, $\tilde{s}_{p,j}^{(\alpha)}$ can be chosen as $$\tilde{s}_{p,j}^{(\alpha)} = f_c(I_p, F_j) f_d(D_p, D_j) f_\alpha(\alpha_p, \alpha_j) f_s(p,j) \qquad (9)$$

where $f_c(I_p, F_j)$, $f_d(D_p, D_j)$ and $f_s(p,j)$ are similarly defined as color, depth, and spatial distance similarity functions.

The term $f_\alpha(\alpha_p, \alpha_j)$ is the similarity function between $\alpha_p$ and $\alpha_j$. Any similarity functions can be used and a simple choice is $f_\alpha(\alpha_p, \alpha_j) = e^{-\|\alpha_p - \alpha_j\|_2/\sigma_\alpha}$, where $\sigma_\alpha$ is a positive spread parameter. For real-time implementation, various simplifications to Equations (9), (5) and (6) can be performed. For instance, for simple filtering, only the term $f_s(p,j)$ can be used and Equation (9) reduces to $\tilde{s}_{p,j}^{(\alpha)} = f_s(p,j)$.

In principle, this new estimate can be iterated to update $F_p$ and $B_p$, and then $\alpha_p$ again using the above techniques. Most of these can be written as filtering processes with a form similar to Equation (8) above.

Figure 7A:
FIG. 7(a) shows the initial matting result and FIG. 7(b) shows the refined matte.
Figure 7B:

Experiments show that acceptable result can be obtained by performing Equations (2a), (2b) and then Equation (4) once, which greatly reduces the arithmetic complexity for finding approximately $F_p$ and $B_p$, and $\alpha_p$ for real-time foreground extraction and hence view synthesis. Exemplary results are shown in FIG. 7. FIG. 7 shows the matting result of Bayesian Equation (4) with $\lambda=0$ and $\lambda=0.01$, where FIG. 7(a) is the initial matting result of equation (4) with $\lambda=0$ and FIG. 7(b) is the refined matte by equation (4) with $\lambda=0.01$.

In extracting semi-transparent objects, $B_p$, $I_p$ and $\overline{\alpha}_p$ are given and $F_p$ needs to be extracted in the partial occluded region. Except at the object boundary, $\alpha_p \approx \overline{\alpha}_p$ and $B_p$ is known from the partial occlusion data, hence $$F_p \approx \frac{1}{\overline{\alpha}_p}\{I_p - (1-\overline{\alpha}_p)B_p\}. \qquad (10)$$

Further smoothing of $F_p$ by Equation (2a) can be performed.

Alternatively, one can assume that $F_p$ is a random vector and estimate $F_p$ by maximum likelihood or maximum likelihood like method. This amounts to minimizing $$E(F_p) = \rho(e_p) + \lambda_F \rho_F(F_p - \overline{F}_p).$$

For Gaussian distributed $e_p$ and $F_p$, Equation (10) reduces to $$E(F_p) = \|I_p - \{\overline{\alpha}_p F_p + (1-\overline{\alpha}_p)B_p\}\|_2^2 + \lambda_F \|\Sigma_F^{-1/2}(F_p - \overline{F}_p)\|_2^2,$$

where $\Sigma_F$ is the covariance matrix of $F_p$, which can be estimated from neighboring known pixels. This gives $$F_p = (\overline{\alpha}_p I + \lambda_F \overline{\alpha}_p^{-1} \Sigma_F^{-1})^{-1}[I_p - (1-\overline{\alpha}_p)B_p + \Sigma_F^{-1}\overline{F}_p]. \qquad (11)$$

Equation (11) reduces to Equation (10) when $\Sigma_F^{-1}$ is equal to zero, which means that there is no uncertainty in $F_p$. If $\lambda_F \overline{\alpha}_p^{-1} \Sigma_F^{-1}$ is approximated by $\varepsilon I$, where I is the identity matrix and $\varepsilon$ is a positive constant (usually small), Equation (11) reduces to $$F_p \approx (\overline{\alpha}_p + \varepsilon)^{-1}[I_p - (1-\overline{\alpha}_p)B_p + \varepsilon \overline{F}_p]. \qquad (12)$$

This latter form is attractive as neighboring information of $F_p$ can be used to refine the estimate in Equation (10) through the prior value $\overline{F}_p$, which can be estimated from neighboring pixels with known $F_p$ and there is no need to solve a system of linear equation as in Equation (11). In fact, Equation (12) can also be viewed as one iteration in the iterative solution of Equation (11). Both Equations (10) and (12) can be used at areas away from the boundary. Their values can then be used in the methods introduced above to solve for $F_p$, $B_p$ and $\alpha_p$ at the boundary.

Next consider the foreground depth correction. From the matte of the current foreground, its depth values will be refined. At the object boundary region R, the depth values are inpainted from those values with $\alpha_p = \overline{\alpha}_p$ nearest to R using a method similar to those for $F_p$ and $B_p$ in Equations (2a) and (2b). The depth can be inpainted by predicting the unknown depth using the depth values of its neighbors:

$$\hat{D}_p = \frac{1}{S_p^{(D)}} \sum_{j \neq p \in W_p^{(D)}} s_{p,j}^{(F)} \cdot D_j, \; S_p^{(D)} = \sum_{j \neq p \in W_p^{(D)}} s_{p,j}^{(D)}, \qquad (13)$$

where $\hat{D}_p$ denotes the inpainted depth of the foreground, $S_p^{(D)}$ is a weighting function at location p. Similar to $s_{p,j}^{(F)}$, $s_{p,j}^{(B)}$, and $s_{p,j}^{(\alpha)}$, the weights $s_{p,j}^{(D)}$ in (13) may be chosen an $$\tilde{s}_{p,j}^{(D)} = f_c(I_p, F_j) f_d(D_p, D_j) f_\alpha(\alpha_p, \alpha_j) f_s(p,j) M_j^{(DF)} \qquad (14)$$

where, $f_c(I_p, F_p)$, $f_d(D_p, D_j)$ and $f_s(p,j)$ are similarly defined as color, depth, and spatial distance similarity functions. The term $f_\alpha(\alpha_p, \alpha_j)$ is the similarity function between $\alpha_p$ and $\alpha_j$. and any similarity functions can be used. A simple choice is $$f_\alpha(\alpha_p, \alpha_j) = e^{-\|\alpha_p - \alpha_j\|_p^p / \sigma_\alpha},$$

where $\sigma_\alpha$ is a positive spread parameter and $M_p^{(DF)}$ is a mask which equals 1 when the depth value is known or has been inpainted. The inpainting procedure is also similar to those of $F_p$ and $B_p$, where unknown depth values are gradually inpainted from the known depth values.

If necessary, further processing of the depth inside the object can be performed to enhance the synthesis quality.

For example, the depth values around the object boundaries may be sharpen to enhance 3D effect. Moreover, spatial-temporal joint texture-depth filtering may be performed to improve depth-texture consistency and improve temporal stability as will be discussed subsequently.

Up to now, there has been disclosure of how the shape, texture, and depth values of the foreground are refined. Consideration is now given to efficient implementation and fast algorithms. First, the efficient implementation of the inpainting filter in Equations (2a), (2b) and (2c) is considered. From Equation (2a)

$$\hat{F}_p = \frac{1}{S_p^{(F)}} \sum_{j \neq p \in W_p^{(F)}} s_{p,j}^{(F)} \cdot F_j$$

where $$s_{p,j}^{(F)} = f_c(I_p, F_j) \cdot f_d(D_p, D_j) \cdot f_s(p, j) \cdot M_j^{(F)} \text{ and}$$

$$S_p^{(F)} = \sum_{j \neq p \in W_p^{(F)}} s_{p,j}^{(F)}.$$

The inpainting for the background is similar. On the other hand, the smoothing filter in Equation (2c) reads $$\hat{\alpha}_p = \frac{1}{S_p^{(\alpha)}} \sum_{j \neq p \in W_{p,j}^{(\alpha)}} s_{p,j}^{(\alpha)} \cdot \alpha_j,$$

where $$\tilde{s}_{p,j}^{(\alpha)} = f_c(I_p, F_j) f_d(D_p, D_j) f_\alpha(\alpha_p, \alpha_j) f_s(p, j) \text{ and}$$

$$S_p^{(\alpha)} = \sum_{j \neq p \in W_p^{(B)}} s_{p,j}^{(\alpha)}.$$

Both of them have the form of a weighted sum and hence their implementations are similar. To reduce the arithmetic complexity such as the number of multiplications in the weighted sum, the weight functions $f_c(I_p, F_j)$, $f_d(D_p, D_j)$, and $f_s(p,j)$ in $s_{p,j}^{(F)}$ (and similarly in $\tilde{s}_{p,j}^{(\alpha)}$ with also $f_\alpha(\alpha_p, \alpha_j)$) are quantized to limited discrete levels. Therefore, their products can be precomputed and stored as canonical signed digits (CSD) as described in the G. A. Ruis article or sum-of-powers-of-two coefficients as described in the article S. C. Chan and W. Liu et al., "Multiplierless Perfect Reconstruction Modulated Filter Banks with Sum-of-powers-of-two Coefficients," *IEEE Signal Processing Letters*, vol. 8, pp. 163-166, (2001), which is incorporated herein by reference in its entirety. The products are in the form:

$$\sum_{l \in \{1,2,34\}} p_l 2^{-l}, \text{ where } p_l \in \{0, \pm 1\}. \quad (15)$$

Consequently, the multiplication of a number u with the above CSD in Equation (15) can be implemented as $$u \sum_{l \in \{1,2,34\}} p_l 2^{-l} = \sum_{l \in \{1,2,34\}} p_l (u \times 2^{-l}), \quad (16)$$

which amounts to shifting u by $2^{-l}$ for each nonzero $p_l$ and adding them together. Thus, the multiplication of such CSD number with $F_j$ can be efficiently implemented as a series of binary shifts and accumulation. Therefore, the weighted sum can be implemented without multiplications up to a scaling of $S_p^{(F)}$ ($S_p^{(\alpha)}$), which again can be computed similarly. A division is required to obtain the filter output which can be implemented by a table look up or other fast method. Note that $M_j^{(F)}$ assumes a value of 0 and 1 which indicates whether the product will be multiplied to $F_j$ or not during the accumulation.

In the smoothing case, filter outputs at different locations can be computed in parallel to reduce the computational time.

For fast implementation, the color terms $f_c(I_p, B_j)$ or $f_c(I_p, F_j)$ and depth term $f_d(D_p, D_j)$ can be set to one, which amounts to weighted prediction from neighboring known values or updated pixels.

Furthermore, different predefined support of the window $W_p^{(F)}$ can be designed and chosen according to the $M_j^{(F)}$, which closely matches the support. The filter with a support just smaller than $M_j^{(F)}$ can be chosen. Alternatively, if $W_p^{(F)}$ has a larger support than $M_j^{(F)}$, the missing data involved in $W_p^{(F)}$, but not in $M_j^{(F)}$, can be replaced by its nearest neighbor.

The advantage of using a predefined support and weights is that the scaling $S_p^{(F)}$ can be absorbed into the weights $\tilde{s}_{p,j}^{(\alpha)}$ to form a set of fixed filter coefficients $\tilde{s}_{p,j}^{(\alpha)}/S_p^{(F)}$ which again can be represented as CSD. As a result, the entire filtering can be implemented using shifts and additions only.

A fast predefined matting profile is another aspect of the invention. For fast implementation, it can be assume that the matte follows a "predefined profile". For instance, the foreground binary shape image may be filtered by the following Gaussian kernel filter with a certain spread parameter σ on boundary areas to obtain $\overline{\alpha}_p$.

$$\hat{\alpha}_p = \frac{1}{S_p^{(\alpha)}} \sum_{j \neq p \in W_p^{(\alpha)}} s_{p,j}^{(\alpha)} \cdot \alpha_j = \frac{1}{S_p^{(\alpha)}} \sum_{j \neq p \in W_p^{(\alpha)}} \exp\left(-\frac{1}{2\sigma^2}\|p-j\|_2^2\right) \cdot \alpha_j. \quad (17)$$

This is equivalent to using Equation (8) with β=0 and $$\tilde{s}_{p,j}^{(\alpha)} = \frac{1}{S_p^{(\alpha)}} \exp\left(-\frac{1}{2\sigma^2}\|p-j\|_2^2\right)$$

with the input given by the input binary shape/matte $\alpha_j$ $$\tilde{\alpha}_p = \beta \alpha_p + (1-\beta)\hat{\alpha}_p = \beta \alpha_p + \frac{1-\beta}{S_p^{(\alpha)}} \sum_{j \neq p \in W_p^{(\alpha)}} s_{p,j}^{(\alpha)} \cdot \alpha_j = \sum_{j \in W_p^{(\alpha)}} \tilde{s}_{p,j}^{(\alpha)}. \quad (8)$$

In other words, instead of estimating the matte using Equation (4) and smoothing, the binary shape image is filtered to obtain a predefined profile independent of the observation. This considerably reduces the complexity at the expenses of slightly degraded performance.

Alternatively, the predefined profile $\hat{\alpha}_p$ can be used as the: priori information for Equation (4) for refining the matte using the inpainted foreground and background. The filter coefficients $$\tilde{s}_{p,j}^{(a)} = \frac{1}{S_p^{(a)}} \exp\left(-\frac{1}{2\sigma^2} \|p - j\|_2^2\right)$$

can be quantized to CSD and filtered out. Thus this estimate can be implemented by shifts and additions only.

After the current foreground has been extracted, the background has to be updated accordingly. Both the texture and depth need to be updated.

In updating texture the image data contained in the partial occlusion data associated with the foreground extracted is used to update the dis-occlusion area of the remaining background. At those locations where the matte of the current foreground are nonzero, all pixels covered by the partial occlusion data in the background are over written to remove the trace of foreground in the updated background, except at the boundary of the partial occlusion image data where matting will be performed with the current background to obtain a smooth transition.

Additional inpainting may be required to fill in possible holes. This can be performed by the technique of Equation (2b).

The depth data must also be updated. If the just extracted foreground/object is not the one with the smallest depth in an overlapping objects situation, the partial occlusion data should provide at least the mean depth value inside the current object defined by the associated shapes. Then, the depth information of the next object, usually having the closest mean depth with the foreground just extracted, will be updated using the partial occlusion data.

Inpainting may be required to fill in the holes within the boundary defined by the next object. Smoothing or other processing of the depth values may be required within the object boundaries.

The extraction and updating processes mentioned above will be repeated for the next object (usually the one with the smallest mean depth) until all objects have been processed.

During matting, certain boundary regions may not contain any color and depth data, the shape image will then be used as the refined shape.

Figures 3A, 3B:
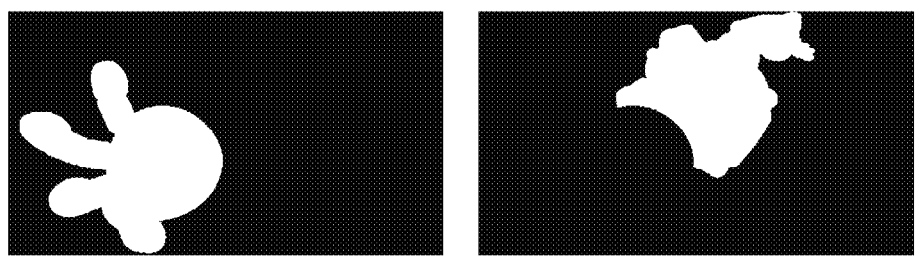
FIG. 3(a) shows a shape image of an object 1 and FIG. 3(b) shows a shape image of an object 2.
Figure 8A:
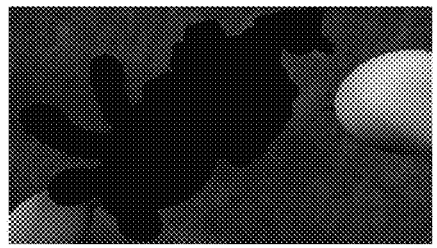
FIG. 8(a) shows the background of the image in FIG. 2(a) after extraction of foreground objects.
Figure 8B:
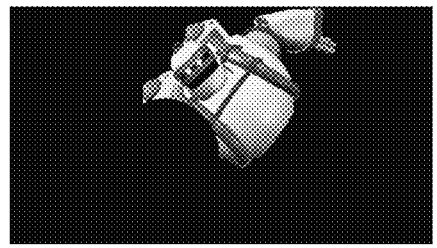
FIG. 8(b) shows objects extracted using the shape images of object 1 and FIG. 8(c) shows objects extracted using the shape images of object 2.
Figure 8C:
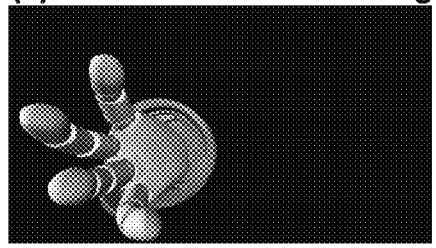

FIG. 8(a) shows the background of the image of FIG. 2(a) after extraction of foreground objects. FIG. 8(b) shows objects extracted using the shape images of object 2 in FIG. 3(b) and FIG. 8(c) shows objects extracted using the shape image of object 1 in FIG. 3(a).

Figure 9A:
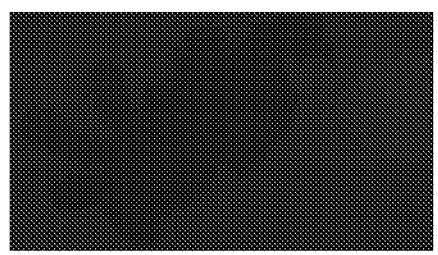
FIG. 9(a) shows the background after object extractions.
Figure 9B:
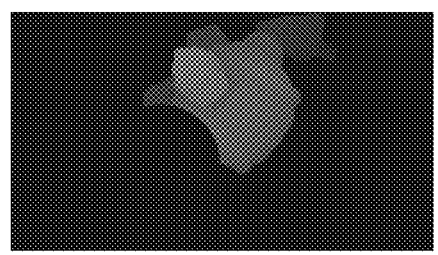
FIG. 9(b) shows objects extracted using object 1 and FIG. 9(c) shows objects extracted using object 2.
Figure 9C:
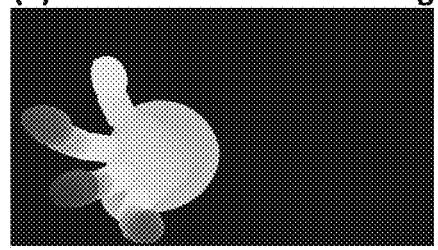

FIG. 9 shows depth maps after object extractions where FIG. 9(a) shows the background after object extractions, FIG. 9(b) shows objects extracted using object 1 and FIG. 9(c) shows objects extracted using object 2;

For storage and transmission the compression of image, depth and matte data at occluded areas is necessary.

As mentioned, the partial occlusion data contains the additional information required to fill in partial occlusion areas to facilitate view synthesis with low artifacts over a specified view point change. The partial occlusion data contains the image data and their associated depth and matte (opacity) data so that they can be matted with the original video and depth data of a particular view to perform low artifact view synthesis.

From FIG. 5, one can see that the depth map associated with the partial occlusion data of an object is usually smooth, except at local discontinuities. For the example in FIG. 5, there is no semi-transparent object and hence the mean opacity is equal to 1. Usually the variation of the matte is very small and can be represented using just a mean value. Thus, one only needs to compress a binary image. If the matte at the boundary of the binary image assumes a value different from the mean value, they can be covered by non-overlapping blocks, which can be coded using block-based image coding techniques.

To compress the image, depth and matte data (as mentioned above, the real-valued matte to be coded will be around the boundary of the binary shape image) of the dis-occlusion area, conventional waveform coding techniques can be employed, such as transform coding using DCT or sub-band coding techniques such as wavelet transform, etc. See, as R. M. Gray, "Source Coding Theory," Kluwer Academic Publishers, (1990), which is incorporated herein by reference in its entirety. Since transform coding usually works on data blocks, the disocclusion data is covered by a minimum number of blocks with respect to the original image coordinate.

Figure 10A:
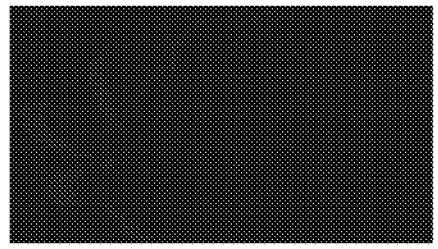
FIG. 10(a) illustrates partial occlusion image data estimated from the shape and depth map.
Figure 10B:
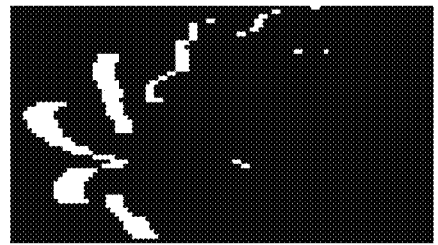
FIG. 10(b) illustrates locations of blocks for covering the partial occlusion image data for block-based coding.

FIG. 10(a) illustrates partial occlusion image data estimated from the shape and depth map, and FIG. 10(b) illustrates the locations of blocks for covering the partial occlusion image data for block-based coding. In FIG. 10(b), the locations of the (8×8) blocks (white in color) used to cover the disocclusion data are shown. In general, rectangular blocks, variable block sizes or other partitions can also be used. The disocclusion area is assumed to be divided into non-overlapping rectangular blocks for coding.

Given the shape image and the depth map of an object A in the left view, the shape image of the object A in the right view, A' can be generated. The area in the original shape image which does not overlap with the shifted shape image represents the disocclusion area due to this object. The size of this area is related to the shift of the camera position between the left and right views. Therefore, the size disocclusion area is chosen from the maximum camera shift that can be supported during the view synthesis. The intersection of this area with shape images of an object behind the current object, e.g., B, represents the corresponding disocclusion of A in B. FIG. 10 (a) shows the disocclusion area of objects 1 and 2 on the background.

If the compressed shape and data map are used to determine the disocclusion region, then the disocclusion region can be uniquely determined at the decoder given the camera position shift of the left and right views. Alternatively, the number of the image blocks in the horizontal direction following each block containing the left boundary of the shape image can be coded. The number of image blocks on two consecutive row of blocks arising from the same left boundary can be differentially coded. See, U.S. Pat. No. 2,605,361 of C. Chapin Cutler, "Differential Quantization of Communication Signals," filed Jun. 29, 1950, issued Jul. 29, 1952, which is incorporated herein by reference in its entirety.

The image data is similar to the depth and matte data except it contains three color components. Commonly used color components include YCrCb or YUV color components with or without decimation.

Figure 11:
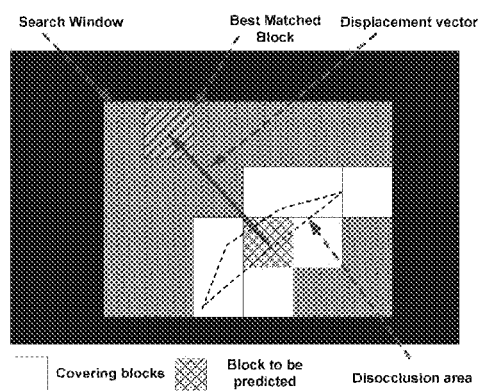
FIG. 11 is an intercomponent displacement prediction diagram.

According to the present invention there are several methods to further reduce the bandwidth for the coding the partial-occlusion data as follows:
 1. predict the partial occlusion data from the input video and depth map,
 2. predict each block of the partial occlusion data from previous coded neighboring blocks,
 3. gradually increase the quantization error for blocks further away from the starting depth discontinuities on the same row First the method of predicting from input video/stereo and depth map(s) is considered. Since the image and depth partial occlusion data mostly come from the background layers, their values are close to or correlated with nearby pixels in the input image and depth map, respectively. Given an image (depth) block to be coded, block matching can be used to find a similar block within a certain search range from the input image (depth map). Previously coded pixels can also be included in the search area. If the prediction error of the best matching predicting block is large, then other coding modes will be considered. Otherwise, the best matching block can be used as a predictor to the current block and the corresponding displacement from the current to the best matching block will be coded. For instance, additional prediction from neighboring displacements may be used to reduce the magnitude of the displacement, and the residual displacement vector will be entropy coded. This is similar to motion estimation of conventional video compression, but it is employed in the context of disocclusion data and the prediction is within the current time instant. This method is referred to as "inter-component displacement prediction" as it is based on the displacement prediction between the image (depth) and the partial disocclusion components. See FIG. 11 which shows an intercomponent displacement prediction diagram. For stereo images, the partial disocclusion image data at one view can be predicted from the other.

Since the adjacent depth value of the partial occlusion data can be used to indicate the location of the current pixel in the other view, it can be used to extract the predictor from the other view.

If such a prediction fails, the block may be coded from the data inside the partial occlusion data inside the current frame. An efficient method for predicting the current block from previously coded neighboring blocks is to employ INTRA prediction, where values on the boundary of these coded blocks are used to form a predictor for the current block to be coded. This is frequently employed in current video coding standards. See G. J. Sullivan et al, "Overview of the High Efficiency Video Coding (HEVC) Standard," *IEEE Trans. Circuits and Systems for Video Technology*, vol. 22, pp. 1649-1668, (2012), which is incorporated herein by reference in its entirety.

As noted above, the present invention also involves a new intra prediction method based on bilinear function approximation, which can efficiently handle smooth surface encountered in depth maps, matte, and image data.

Consider a component of the partial disocclusion data, which can be the depth map, matte (in case of semitransparent object with non-uniform opacity), and a particular color component of the image data. Further, assume that the area has been covered by non-overlapping blocks for coding as shown in FIG. 10(b). Each block may be further divided into small blocks for coding.

Figures 12A, 12B:
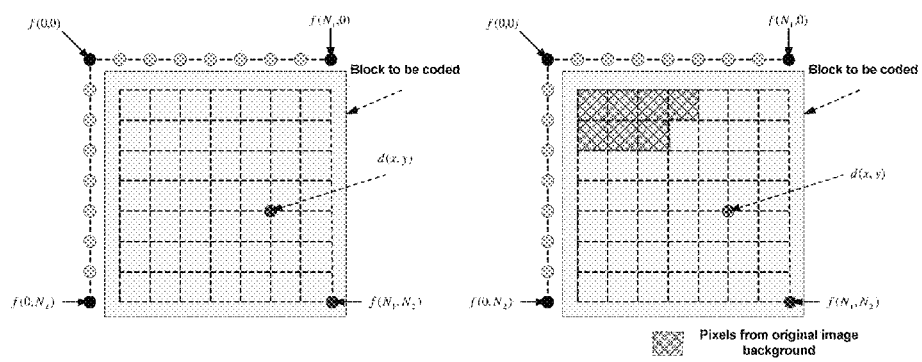
FIG. 12(a) shows a boundary block and FIG. 12(b) shows a non-boundary block.

Let the values inside the block be d (x,y) and they are to be approximated by a bilinear function as indicated in the Wikipedia article. For notation convenient, assume that the bilinear approximation is performed in a rectangular integer grid $(x,y) \in [0, N_1] \times [0, N_2]$. The current block that needs to be approximated is located in the integer grid $(x,y) \in [1, N_1] \times [1, N_2]$ where x and y are respectively the horizontal and vertical coordinates and $N_1 \times N_2$ is the block size (c.f. FIG. 12(a)). In FIG. 12. Matte/Depth/Color image prediction is illustrated by a bilinear function with a block size $N_1 = N_2 = 8$ for illustration. The four parameters to be coded are marked in a black circle. If adjacent blocks are smooth, these parameters can be predicted from the coded pixels on the top, top-left and left of the block to be coded. FIG. 12(a) is a boundary block and FIG. 12(b) is a non-boundary block. The yellow color labeled (gridded) pixels are from the original background.

For simplicity, assume that the approximated values of the bilinear function $f(x,y)$ at $(x,y)$ are given by the following formula $$f(x, y) = f(0, 0)\frac{x}{N_1}\frac{y}{N_2} + f(N_1, 0)\left(1 - \frac{x}{N_1}\right)\frac{y}{N_2} + \qquad (18)$$
$$f(0, N_2)\frac{x}{N_1}\left(1 - \frac{y}{N_2}\right) + f(N_1, N_2)\left(1 - \frac{x}{N_1}\right)\left(1 - \frac{y}{N_2}\right),$$

where $f(N_1,0)$, $f(0, N_2)$ and $f(N_1, N_2)$ are the function coefficients of the bilinear function on the enclosing corners.

For blocks containing the boundaries of the given partial occlusion data, the values d(x,y) to be coded may occupy part of the block (c.f. FIG. 12(b)). Their support is, however, uniquely defined from the shape of the disocclusion data. These locations are parts of a rectangular grid and hence the associated depth values can still be approximated by a bilinear function, which can be specified through the values at the corners of the grid. From the coefficients of an appropriate chosen bilinear function and the shape images, the approximation or prediction to the component values d (x,y) inside the block can be computed. Alternatively, the neighboring pixels in the original background can be used to form a complete block for coding. This is illustrated by the yellow color labeled (gridded) pixels on the top left corner of the block in FIG. 12(b).

The parameters $f(0,0)$, $f(N_1,0)$, $f(0, N_2)$ and $f(N_1, N_2)$ of the approximation function can be obtained from least square or other fitting of Equation (18) to the given data points.

A Fast algorithm which does not require data fitting can also be used in real-time implementation. For non-boundary blocks, the function values from the samples around the corners can be estimated directly to simplify the process. Alternatively, representative points inside the block can be picked and the process can perform a plane fit to the given data. Then the values at the four corners can be evaluated and coded by differential pulse coded modulation (DPCM) as in the Cutler patent and entropy coding from previously coded samples or transform coding, say using (2×2) DCT, as in the Gray text and the article Steven Pigeon, "Huffman Coding," available at http://www.stevenpigeon.com/Publications/publications/HuffmanChapter.pdf. If only the lowest order DCT coefficient is coded, it reduces to a constant approximation to the block.

For non-boundary blocks, the three functional coefficients located on the left-top, right-top and left-bottom corners can be estimated from neighboring coded blocks. For smooth depth value, three of the parameters can be represented by these predictors and only one function coefficient needs to be coded, which again can be DPCM coded from the other function coefficient values. For boundary blocks, all or some of the function coefficients need to be coded. Their values may be correlated with values in nearby coded blocks and hence they can also be predicted from previously coded information.

Another feature of the present invention is the use of hierarchical bilinear approximation. Instead of using a fixed block size, the block size of the bilinear intra prediction can be varied to provide efficient approximation to smooth but locally varying image content. A possible way to select the variable block size is to selectively divide a given block into four equal sized sub-blocks. This yields a variable and hierarchical decomposition of the input image for efficient prediction.

This is illustrated in FIG. 13 where an (8×8) block is considered. If the whole (8×8) block is approximated by a bilinear function, the four parameters are shown as the block circles labelled by $f(0,0)$, $f(N_1,0)$, $f(0,N_2)$ and $f(N_1,N_2)$ as in FIG. 13. If the (8×8) block is to be subdivided into four (4×4) sub-blocks, then each sub-block will require four additional parameters. Consider the (4×4) sub-block on the top left corner of the (8×8) block, which is marked in blue (with slashes inside) color. The three functional coefficients on the top and left are marked in dark circles while the lower right corner coefficient is marked in green (with horizontal lines inside). The three coefficients in dark circles can be predicted from the coded coefficients around their positions. If the depth map is smooth, these predictors can be used as the functional coefficients and only the coefficient marked in green (with horizontal lines inside) needs to be coded, which can again be predicted from the other three coefficients. This happens for the other 3 (4×4) sub-blocks with the additional coefficients marked in green (with horizontal lines inside), except the lower right corner where it also coincides with the coefficients of the original (8×8) block. In other words, whenever a block is split into 4 sub-blocks, if the previously coded coefficients are used to represent the top and left corner coefficients, three more additional coefficients need to be coded.

In FIG. 13, those for the (4×4) sub-blocks are marked in green (with horizontal lines inside) circles and they are labeled as the $1^{st}$ level decomposition. For the (4×4) sub-block, a further decomposition is performed and the additional coefficients to be coded are marked in red (with vertical lines inside) circles.

This process can be applied to larger block sizes to form a hierarchical representation. In each block, the decomposition can be performed until certain approximation accuracy is achieved.

In carrying out the present invention it is also necessary to consider and code residuals. The approximation error, which is called the prediction residuals, can be coded using transform coding or other techniques such as direct Differential Pulse Coded Modulation (PCM) coding of selected blocks of residuals. For example, the locations of a series of smallest sized sub-blocks, say (4×4), with nonzero quantized residuals is specified. The relative locations of the (4×4) sub-blocks in the sequence can be coded by chain code (FIG. 14(a)). This method is efficient for coding isolated nonzero quantized residuals and other sub-block sizes may be used.

Alternatively, the zero and nonzero sub-blocks can be indicated by a binary bit, which can be coded using arithmetic coding (FIG. 14(b)) or quad-tree with arithmetic code. In FIG. 14(b) the binary image in 0 and 1 is coded using context-based arithmetic code.

The quantized coefficients in nonzero sub-blocks can be scanned in a certain order and coded using DPCM or other similar techniques (FIG. 14(c)). In FIG. 14(c) vertical scanning is shown, but horizontal, zigzag or other scanning orders can be used. Combinations of these and other methods can also be used.

Another technique which can be used to predict a block in the current frame is to use data from reference frames (at other time instant or views) which has been compressed previously. This type of inter-frame or inter-view technique is frequently used in multiview video coding as in the S. C. Chan article. Blocks can be coded using either inter prediction or intra prediction as mentioned earlier and the residuals can be coded as mentioned above.

Next the disparity-aware quantization error is considered. The occlusion data further away from the object boundary are typically used when the maximum view point change is selected. However, this may not always be the case and hence when the bit rate is limited, they are given a lower rate. In principle, it is possible to predict the partial occlusion data in one time frame from neighboring frames. However, as the auxiliary data is assumed to be coded independent of the texture codec, it is important to ensure that the reference will not be predicted from a skipped image frame. Otherwise, it may not be possible to reconstruct it. To further reduce the bit rate, sub-band coding can be applied to a run of consecutive horizontal or vertical blocks in the partial occlusion data. For example, in FIG. 10(b), there are many horizontal rows of blocks with size (LN)×(N), where L is the number of consecutive blocks and (N×N) is the block size. Then sub-band coding such as wavelet transform can be applied to these blocks to create a transform with longer length. This will improve the coding efficiency of using (8×8) DCT alone. For instance, horizontal wavelet transform can be performed twice, first to generate a lowest frequency band of size (LN/4)×N and second to form other high frequency bands of sizes (LN/4)×N and (LN/2)×N. The lowest sub-band coefficients can be coded using DCT where the higher frequency coefficients can be coarsely quantized. This effectively generates a transform of size (32×8).

As mentioned, inconsistency or errors between the texture and disparity maps, if not refined or corrected, will lead to obvious artifacts in the rendering. Moreover, as current disparity maps are usually estimated frame by frame, temporal consistency is generally not ensured.

Figure 15A:
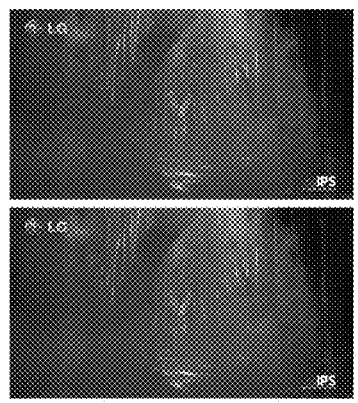
FIG. 15(a) shows two consecutive frames and FIG. 15(b) shows two disparity maps estimated independently by same method with the same setting.
Figure 15B:

FIG. 15(a) and FIG. 15(b) show respectively two consecutive texture and depth image frames estimated using the same stereo estimation method with same parameters. It can be seen that there are significant inconsistencies in the areas labeled with red circles, although the two frames are quite similar. During rendering, this temporal inconsistency can lead to twinkling artifacts at these areas.

A commonly used method for depth map refinement is the bilateral filter as disclosed in the article C. Tomasi et al., "Bilateral filtering for gray and color images," *IEEE Sixth International Conference on Computer Vision*, pp. 839-846, (1998), which is incorporated herein by reference in its entirety. In this method the refined depth value at each pixel is obtained from the average of neighboring pixels, weighted by the spatial difference and intensity difference from the current pixel, according to the following equation $$D'_p = \frac{\sum_{s \in N} w(p,s)c(I_p, I_s)D_s}{\sum_{s \in N} w(p,s)c(I_p, I_s)}$$

where $p=(x_p,y_p)$ is the coordinate of current pixel, $s=(x_s,y_s)$ is the coordinate of a support pixel in a neighborhood N centered around pixel p, $\{I_p\}$ is the input natural image, $\{D_p\}$ is the input disparity map, $\{D_p'\}$ is the output or filtered disparity map, $$w(p,s) = e^{-\|s-p\|_2^2/2\sigma},$$

is a spatial Gaussian weight function with a positive spread parameter $$\sigma_s, \text{ and } c(I_p, I_s) = e^{-\|I_s - I_p\|_2^2 / 2\sigma_c}$$

is color/range weight function with a positive spread parameter $\sigma_c$. For notation convenience, the two dimensional images are indexed by the coordinate p, and the input natural image, disparity map, etc are written as the set indexed by the coordinate p, $\{I_p\}$ and $\{D_p\}$, etc, respectively.

The bilateral filter acts to smooth the image while preserving edges. It is generalized to the joint bilateral filter as shown in T. Matsuo et al., "Weighted Joint Bilateral Filtering with Slope Depth Compensation Filter for Depth Map Refinement," *VISAPP*(2), pp. 300-309, (2013), which is incorporated herein by reference in its entirety. Here the weights are computed from another guidance image rather than the filtering input. The joint bilateral filter is useful when the image to be filtered is not reliable to the desired information, e.g., when it is very noisy or is an intermediate result.

The proposed filter has the following advantages:

1. reduces the artifacts and gradient reversal of conventional bilateral filters around the edges by incorporating local context information in the filtering process, and 2. providing an efficient implementation structure by representing the filter weights by canonical signed digits (CSD) as indicated in the Ruiz article.

The proposed method processes a number of consecutive texture and depth images in a video sequence. By treating the video as a 3D volume, the refined depth map is given by $$D'_p = \frac{\sum_{s \in N} w(p,s) c(I_p, I_s) g(p,s,\xi) R_s D_s}{\sum_{s \in N} w(p,s) c(I_p, I_s) g(p,s,\xi) R_s} \quad (20)$$

where, $p=(x_p, y_p, t_p)$ is the coordinate of current pixel at frame $t_p$, $s=(x_s, y_s, t_s)$ is the coordinate of a support pixel in a neighborhood N centered around pixel p at the $t_s$-th frame, $I_p$ and $I_s$ are the intensity (in principle the color vector can also be used. The intensity is used to reduce the complexity) at locations p and s, respectively. $\{D_p\}$ is the input disparity map, and $\{D_p'\}$ is the output or filtered disparity map. $\xi$ is the edge map volume, which can be obtained by applying classical edge detection methods such as Canny edge detection and Sobel edge detection to each frame of the input nature images.

$$w(p,s) = e^{-\frac{1}{2\sigma_s^2}[(x_s-x_p)^2 + (y_s-y_p)^2 + \rho(t_s-t_p)^2]}$$

is a spatial-temporal Gaussian weight function with a positive spread parameter $\sigma_s$ and a constant $\rho$ to balance the importance of spatial and temporal distance, and $$c(I_p, I_s) = e^{-\|I_s - I_p\|_p^p / 2\sigma_c}$$

is color/range weight function with a positive spread parameter $\sigma_c$.

$\{R_s\}$ are precomputed confidence maps for each frame of the disparity maps and $R_s$ is its value at location s. From observation of disparity maps acquired from popular methods such as stereo estimation or depth cameras, the disparity maps around object boundaries are usually very noisy. Thus, it is desirable to reduce the confidence of the disparity map around the edges. For instance, it can be precomputed as $$R_s = e^{-DT(E_d, s')/\sigma_d}, \quad (21)$$

where $E_d$ is the edge map of the disparity map, $DT(E_d, s')$ is a distance transform function which labels each pixel s' of the image with the distance to the nearest obstacle pixel, and $\sigma_d$ is a predefined positive spread parameter.

$g(p,s,\xi)$ is a measure of local context information and it is given by $$g(p, s, \xi) = \begin{cases} 1, & \text{if pixel at } (x_p, y_p, t_s) \text{ is an edge pixel or there} \\ & \text{is no edge from pixel } (x_p, y_p, t_s) \text{ to } s \text{ in } \xi \\ 0, & \text{if pixel } (x_p, y_p, t_s) \text{ isn't an edge pixel and there} \\ & \text{is any edge from pixel } (x_p, y_p, t_s) \text{ to } s \text{ in } \xi \end{cases} \quad (22)$$

Figure 16A:
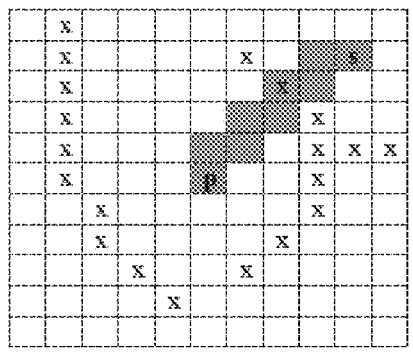
FIG. 16(a) shows the input to form $g(p,s,\xi)$
Figure 16B:
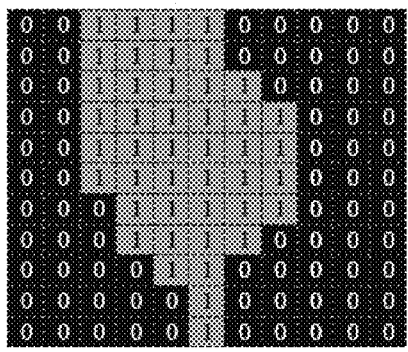
FIG. 16(b) shows $g(p,s,\xi)$ obtained from FIG. 16(a)

The computation of $g(p,s,\xi)$ is shown in FIG. 16 (*a*). The edges are labeled by "x". If p is an edge pixel, then $g(p,s,\xi)=1$. If p isn't an edge pixel, given a patch of edge map at frame t, draw a straight line from p to s. The straight line must be 4 connected sub-blocks and it is labeled by blue (shading) in FIG. 16(*a*). If there is any edge pixel in the line, $g(p,s,\xi)=1$, else $g(p,s,\xi)=0$. An example of the computed (a) is shown in FIG. 16 (*b*). In particular, FIG. 16 shows the edge labeled by "x". The two pixels under consideration are labeled by p and s, and the straight line from P to s is in blue (shading). In FIG. 16(*b*) $g(p,s,\xi)$ is obtained from FIG. 16(*a*), where local pixels are labeled by 1 and in brown color and non-local pixels are labeled by 0 in black color.

Instead of performing the filtering on a block of data in both spatial or temporal domain, it can be performed using Equation (20) for spatial filtering (i.e. for the current frame only), followed by temporal filtering again using Equation (20) (i.e. using a small spatial window of size say 2×2 but a longer time window). This will greatly reduce the arithmetic complexity. This technique is commonly called "separable filtering".

Figure 17:
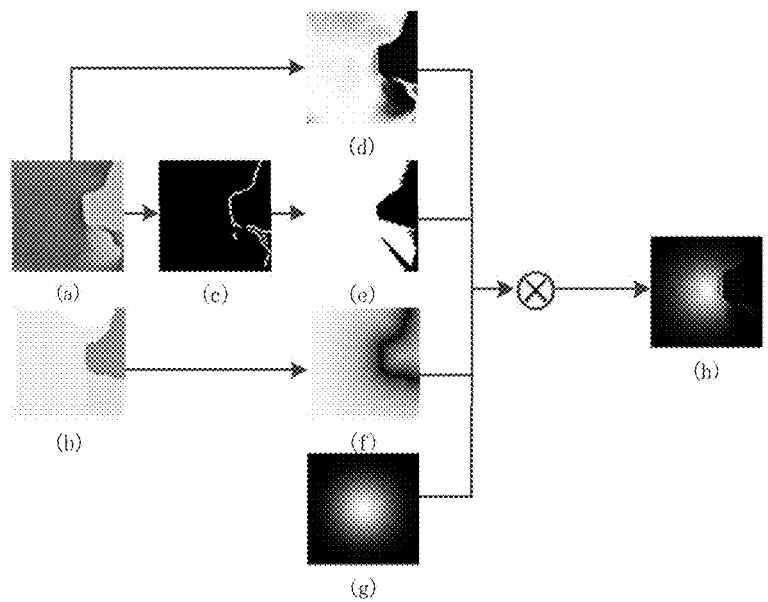
FIG. 17 illustrates the steps of separable filtering.

To better illustrate the filtering process, a patch at frame t is selected as an example and each component in Equation (19) is selected. A flow diagram of how the weighings are combined is shown in FIG. 17. In FIG. 17, the input image at time t is shown at (a), input depth at time t is shown at (b), (c) is the estimated edges of (a), (d) is the color weighting $c(I_p, I_s)$ at time t, (e) is the local context mask $g(p,s,\xi)$, (f) is the confidence $\{R_s\}$ of disparity map; (g) is the spatial-temporal Gaussian weighting at time t, and (h) is the final combined weighting function.

The key features are:

1. Temporal weightings are used to improve the temporal stability of the depth map, especially at static region.

2. A local context mask function $g(p,s,\xi)$ is used to emphasis the local context using the edge information.

3. The weighting around the edges of the disparity map is reduced by adding a depth confidence term R, shown in FIG. 17 (*f*).

4. The weighting functions, w(p,s) and $c(I_p, I_s)$ are not necessarily Gaussian weighting (kernel) functions. In fact, they can be quantized to a limited set of values, so that the product can be precomputed and represented in the form of canonical signed digits (CSD) so that the multiplication of w(p,s)c($I_p,I_s$) with $D_s$ can be implemented by additions only. This greatly reduces the arithmetic complexity in implementation the refinement method.

5. The use of separable spatial and temporal filtering to reduce arithmetic complexity.

Figure 18:
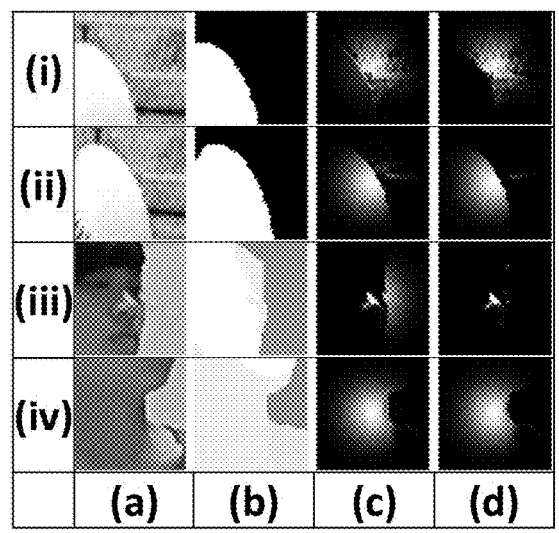
FIG. 18 is a visualization of local kernel rows for four different patches.

FIG. 18 shows some representative patches and compares their weighting kernel with a conventional bilateral filter. Local weights estimated by the conventional bilateral filter and the proposed method are shown in column (c) and (d), respectively. In FIG. 18 row (iii), shows that parts of the object share similar intensity with the background and the conventional bilateral filter will assign higher weight to these background areas, which will affect the depth value inside the object. With the use of edge information, these undesirable contributions of these background pixels are suppressed by the local context mask of the proposed method.

The spatially refined disparity maps are shown in FIG. 19. FIG. 19 shows a refined disparity map comparison at frame t wherein FIG. 19(a) is a color image; FIG. 19(b) is an original disparity map; FIG. 19(c) is a refined disparity map filtered by conventional bilateral filter and FIG. 19(d) is a refined disparity map filtered by the improved method of the present invention. This shows the proposed method leads to sharper edges and fewer errors inside the object.

The temporally refined disparity maps are shown in FIG. 20. Disparity maps before refinement are shown in FIG. 20(a) and disparity maps after refinemnt are shown in FIG. 20(b). The disparity maps are more stable in stationary areas and change gradually at consecutive frames which will lead to fewer artifacts during rendering.

Although the joint weighted filtering can be implemented in parallel, its complexity is still high for real-time applications. An element of the present invention is a discrete-level weighting function method which provides for efficient implementation.

For the filtering process, $p=(x_p,y_p,t_p)$ is the coordinate of current pixel, $s=(x_s,y_s,t_s)$ is the coordinate of a support pixel in a neighborhood N centered around pixel p. More specifically, the following variables are precomputed and quantized to discrete levels:

$(x_s-x_p)^2+(y_s-y_p)^2+\rho(t_s-t_p)^2$ in w(p,s) is quantized into $n_d$ levels. The range of $d_s$ depends on the selected spatial and temporal window sizes.

The intensity difference between p and s, $e_s=\|I_s-I_p\|$, and its range depends on the range of texture image intensity which is fixed. It is quantized into $n_e$ levels.

The confidence of disparity map $\{R_s\}$, which ranges from 0~1, is quantized into $n_R$ levels.

Other possible methods for reducing the complexity is to reduce the number of filtering samples used in the neighborhood N. N which is centered at p is usually chosen as a square and all pixels inside are used to obtain the filter output. Using an appropriate subset of N such as shown FIG. 21(a) and FIG. 21(b) will provide a tradeoff between performance and arithmetic complexity. Such patterns and further tradeoffs may be varied online according to the available computational power of the processing systems in the applications, say to maintain a constant framework rate etc.

Consequently, the discrete-level weighted filter of Equation (2) can be rewritten as $$D'_p = \frac{\sum_{s\in \tilde{N}} \hat{w}_Q(d_s, e_s, R_s)g(p, s, \xi)D_s}{\sum_{s\in \tilde{N}} \hat{w}_Q(d_s, e_s, R_s)g(p, s, \xi)}, \quad (23)$$

where $\tilde{N}$ is the subsampled neighborhood, $\hat{w}_Q(d_s,e_s,R_{s'})=w_Q(p,s')c_Q(I_p,I_{s'})R_{Q,s'}$ is the product of quantized weighting functions and the subscript is used denoted the quantized quantities. Since there are $n_d \times n_e \times n_R$ levels, the product can be obtained directly by means of a lookup table of size $n_d \times n \times n_R$. Moreover, the values inside the lookup table can also be pre-converted to Canonical signed digit (CSD) as in Equation (15). The multiplication of $D_s$ with such CSD can be efficiently implemented by shifts and additions only as in Equation (16).

As $g(p,s,\xi)$ is binary valued, the numerator and denominator can be computed with only additions and shifts, leading to efficient multiplier-less implementation. To evaluate the performance of the discrete-level weighted filter, an experiment with $n_d=n_e=n_R$ is performed for quantization levels ranging from 2 to 11 and other settings of the filter kept unchanged. The peak signal-to-noise ratio (PSNR) is computed between the results of the quantized and original filters are shown in FIG. 22(a). It can see that the PSNR is almost unchanged after 6 levels and the PSNR value is 42 dB, which is high enough for practical applications. The filter outputs for the discrete-level weighted and original filters are shown in FIG. 22(c) and FIG. 22(b), respectively, and they are almost identical.

As mentioned, the artifacts-aware view synthesis (AAVS) method is based on the fact that the human 3D perception, like the auditory system, is able to tolerate considerable deformation of the left and right eye images without significantly impairing the overall 3D perception and quality. On the other hand, artifacts which lead to a significant deviation from a natural image, such as ghosting, significant local deformation, holes or structural inconsistency, will lead to significant degradation of the overall perception quality.

Figure 23:
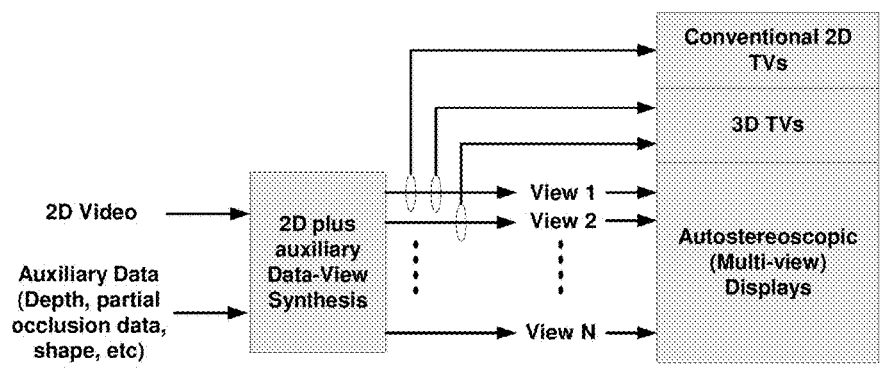
FIG. 23 is a block diagram of a system for view synthesis using 2D video plus auxiliary data to support view point change in conventional displays.

It is also observed in experiments that new views synthesized using the proposed 2D video plus auxiliary data with depth method are usually closer to natural images than using two views with a less accurate depth maps. By exploring the human 3D perception and the above fact, the proposed AAVS:

1. Synthesizes all the views required, if only one video and its associated depth video are available, by using the 2D plus auxiliary data with depth method. The system for this is shown in FIG. 23. Few visual artifacts and lower bandwidth/storage can be obtained at the expense of degraded 3D effect.

2. Synthesizes the views required by the stereo or autostereoscopic displays corresponding to the left (right) eye using the left (right) stereo videos and the proposed 2D video plus auxiliary data with depth synthesis method (Lower part of FIG. 25). Significantly fewer visual artifacts are obtained using this approach than using the stereo views to synthesize all the required views.

Some possible configurations are summarized in FIGS. 23 to 26. In particular, FIG. 23 is a block diagram of a system for view synthesis using 2D video plus auxiliary data to support view point change in conventional 2D TVs, 3D TVs, and autostereoscopic (multi-view) displays. It is assumed that the latter has N views.

Figure 24:
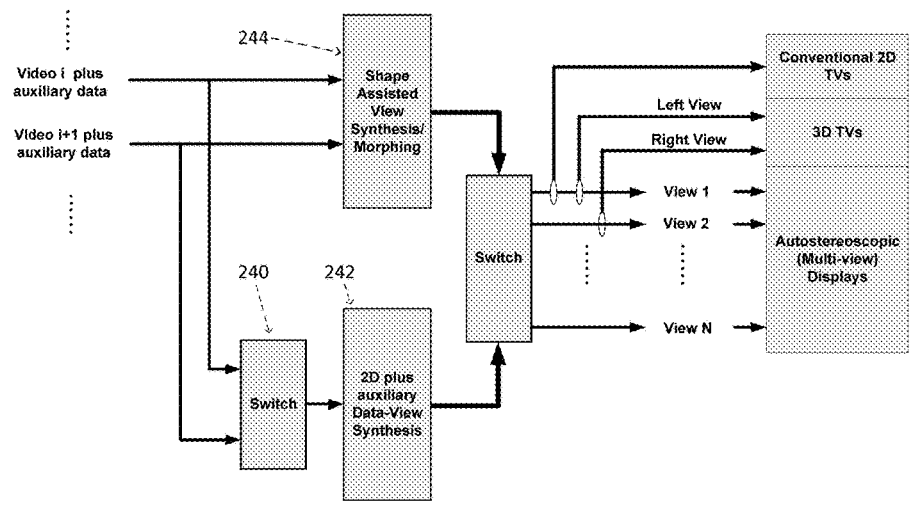
FIG. 24 is a block diagram of an embodiment of a system for view synthesis using adjacent 2D videos plus auxiliary data in a multiple input videos scenario to support view point change in conventional displays.

FIG. 24 is a block diagram of an embodiment of a system for view synthesis using adjacent 2D videos plus auxiliary data in a multiple input videos scenario to support view point change in conventional 2D TVs, 3D TVs, and autostereoscopic (multi-view) displays. It is assumed that the latter has N views. When the view point is near video i, it will be selected for performing view synthesis by passing the data through a switch 240 or a switching process to the 2D plus auxiliary data view synthesis engine 242. In a user region around the mid-point of the two camera views with a user selectable width, fusion of views will be performed in the shape assisted view synthesis/morphing algorithm or engine 244. This reduces artifacts from switching from one view to the other. The appropriate mode will be selected by the output switch or switching process to drive the intended displays.

Figure 25:
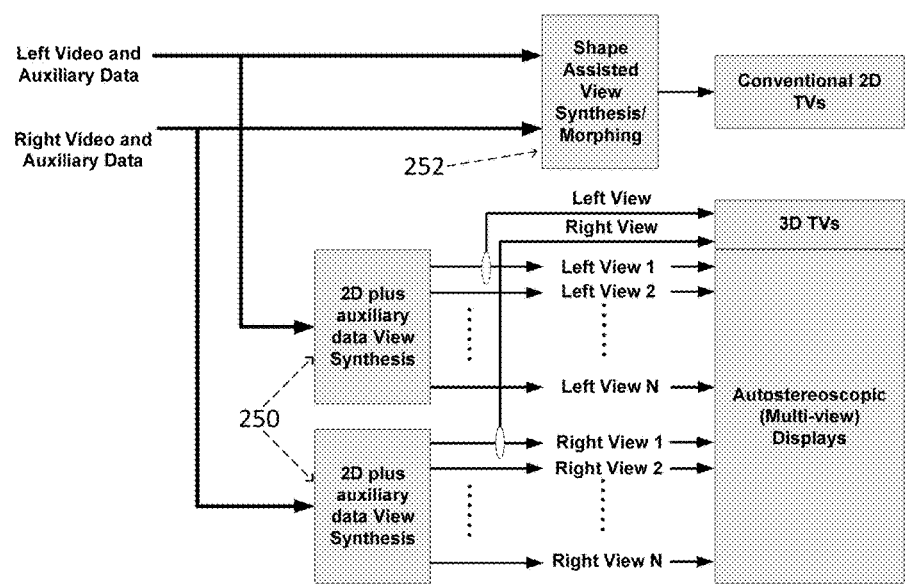
FIG. 25 is a block diagram of an embodiment of system for view synthesis using adjacent stereo videos plus auxiliary data in a multiple input videos scenario to support view point change in conventional displays.

FIG. 25 is a block diagram of an embodiment of a system for view synthesis using adjacent stereo videos plus auxiliary data in a multiple input videos scenario to support view point change in conventional displays. View synthesis using adjacent stereo videos (e.g. video i and video i+1 as shown in FIG. 24) plus auxiliary data (depth, partial occlusion data, shape, etc.) in a multiple input videos scenario to support view point change in conventional 2D TVs, 3D TVs, and autostereoscopic (multi-view) displays. It is assumed that the latter has N left and right views. This is similar to FIG. 23 for 2D videos input, except that the left and right views of the stereo video will be processed separately to generate respectively the left and right views required by the various displays, except the 2D display where either one will be sufficient. When the view point is near video i, it will be selected for performing view synthesis by passing the data through a switch or a switching process (not shown in FIG. 25) to the 2D plus auxiliary data view synthesis engines 250. In a user region around the mid-point of the two camera views with a user selectable width, fusion of left and right views of the stereos will be performed by the shape assisted view synthesis/morphing algorithm or engine 252. This reduces artifacts from switching from one view to the other. The appropriate mode will be selected by the output switch or switching process to drive the intended displays.

Figure 26:
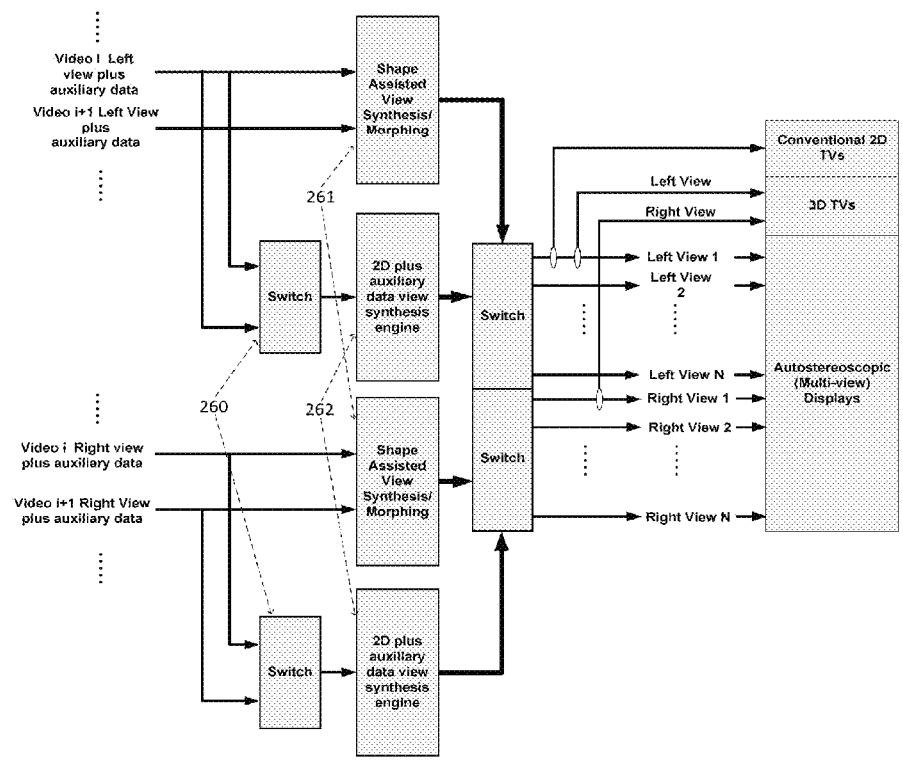
FIG. 26 is a block diagram of a second embodiment of the system of FIG. 24 for view synthesis using adjacent stereo videos plus auxiliary data in a multiple input videos scenario to support view point change in conventional displays.

FIG. 26 is a block diagram of a second embodiment of the system of FIG. 24 for view synthesis using adjacent stereo videos plus auxiliary data in a multiple input videos scenario to support view point change in conventional displays. View synthesis using adjacent stereo videos (e.g. video i and video i+1 as shown) plus auxiliary data (depth, partial occlusion data, shape, etc.) in a multiple input videos scenario to support view point change in conventional 2D TVs, 3D TVs, and autostereoscopic (multi-view) displays. It is assumed that the latter has N left and right views. This is similar to FIG. 24 for 2D videos input, except that the left and right views of the two stereo videos will be processed separately to generate respectively the left and right views required by the various displays, except the 2D display where either one will be sufficient. When the view point is near video i, it will be selected for performing view synthesis by passing the data through a switch or a switching process 260 to the 2D plus auxiliary data view synthesis engines 262. In a user region around the mid-point of the two camera views with a user selectable width, fusion of left (right) views of the two stereos will be performed by the shape assisted view synthesis/morphing algorithm or engine 261. This reduces artifacts from switching from one view to the other. The appropriate mode will be selected by the output switch or switching process to drive the intended displays The method can also be used to synthesize a continuum of viewpoints from a set of adjacent 2D or stereo videos plus the auxiliary data with depth (shown respectively in FIGS. 25 and 26 for 2D and stereo videos). It is unnecessary to transmit all the 2D videos and auxiliary data to the receiver for view synthesis. In fact, they can be selectively transmitted according to the user view point. Selective transmission has been proposed before for image-based rendering. See the S. C. Chan article. In the current invention, only one video plus auxiliary data (the video can be 2D or stereo) is normally required to generate the multiple views required for the displays. Only when there is view switching, i.e. changing the view point from video to another, or continuous view synthesis at the intermediate camera position, is it necessary to have the data from both videos plus their auxiliary data.

There are several possible configurations as follow:

1. A user is using two such video-plus-auxiliary data streams from adjacent views (either 2D or stereo videos) and performs view synthesis or view switching among the two views in a certain time interval. If switching is required for the next adjacent pair of videos and auxiliary data, then the new information will be retrieved in the next time interval. If the two pair of videos has an overlap, then one more video plus the auxiliary data will be required and the other can be dropped. Thus, the overall bandwidth consists of the two videos plus their auxiliary data.
2. Instead of transmitting a pair of adjacent videos plus the auxiliary data to the user, the data can be transmitted during view switching. In order to synthesize the intermediate between the two views, both video data should be available at the switching period. Thus, the overall bandwidth is further reduced to one video plus the auxiliary data, except at the switching period, where both data should be available.
3. If the view during switching in (2) is further frozen, i.e. performing intermediate synthesis or morphing at a given time instant instead of continuously over a period of time, then the overlap of the two video data can be further minimized. In fact, since the information required during switching is considerably reduced, overlapping data from videos further apart can be transmitted to the user to enable them to emulate the fly over effect over multiple views. The image data at this time instant can also be chosen by the content providers to record important events where fly over effect may be recalled by the users later on or for users' preview of nearby views before switching to the target view. In this case, the user preview nearby views before making the switching at a later time. In order not to disturb the normal view of the current view in the displays, the resulting synthesized fly-over effects can be separately displayed in a sub-window or picture-in-picture window for users' recall or selection.

The technique is also applicable to videos which may be using an image transformation for view synthesis. In these applications, the true depth map may not be available, and an image transformation which aims to match essential corresponding features of the original and target views is performed instead. In this application, such transformation can also be used for some or all of the depth maps in the proposed scene. The resultant transformation information or parameters can also be embedded in the auxiliary data.

If the videos are compressed using inter-frame prediction, then intra-coded picture has to be inserted in the 2D or one of the stereo videos so that the decoder of the user can switch from one 2D/stereo video to another format by decoding during the intra-picture times. If all the compressed videos are available at the decoder, then they can be selectively decoded from compressed data to generate the appropriate views. This provides "free navigation" over a set of videos to support continuum of view point change.

In all these applications, the shape information and partial occlusion data allow partial occlusion areas to be filled when synthesizing new views or sharpening/processing of depth map to improve the quality of the synthesis videos/multiple videos.

The 2D+depth and the auxiliary data method is also suitable for supporting interactive view point change and magnification over a certain range. For stereo videos plus associated depth videos, supporting view point change in conventional 2D displays from one view to the other, significant artifacts will occur if the depth discontinuities etc. are not aligned. Using the new method of the present invention, however, will result in a jump from the view generated by one of the original image to the other at around the mid-point between the left and right viewpoints.

To overcome this undesirable effect, a new shape-assisted view synthesis and morphing method is performed to emulate a fly-over effect from one view to the other (c.f. FIG. 25). Instead of using a conventional morphing method, both views are used to synthesize the required views in a region around the mid-point of the two camera views with a selectable width to emulate the fly-over process. The size of this region and the sweeping rate are determined by certain measurements of artifacts in terms of the agreement of the two views to be combined. The larger the artifacts measured, the lower will be the synthesis quality and the faster will be the sweeping rate in the region. Thus, the visual artifacts are effectively suppressed by the fly-over process. The same technique is also useful when there is a transition from one video to its adjacent view as shown in FIGS. 24 and 26, respectively, for 2D videos and stereo videos input. This supports the concept of "free navigation" over a set of videos to support a continuum of view point change as mentioned above.

The view synthesis algorithm from adjacent views using the auxiliary data and the stereo video and depth data is described as follows. The input will be two adjacent videos and their depth maps. The two videos can be consecutive pairs of videos in a series of videos taken at adjacent viewpoints.

The objective is to synthesize the views with as low visually annoying artifacts as possible. As mentioned, conventional image-based rendering aims to synthesize intermediate views from two adjacent views, which may generate considerable artifacts. With the additional shape and partial occlusion data in the auxiliary data, the visual artifacts can be reduced.

The novel features of this method include:
1. Though shape information has been previously proposed to improve the quality of the synthesized views. This can be done using the methods disclosed in the G. Tech article and the S. C. Chan article mentioned above as well as in J. Lainema et al., "Intra Coding of the HEVC standard," *IEEE Trans. Circuits and Systems for Video Technology*, vol. 22, pp. 1792-1801, (2012); https://en.wikipedia.org/wiki/Bilinear_interpo and https://en.wikipedia.org/wiki/Bilinear_interpolationlation; and T. Kariya et al., "Generalized Least Squares," J. Wiley, 2004, all of which are incorporated herein by reference in their entirety. Considered here is the situation where the information may have been compressed and hence further processing to ensure the consistency of the depth, image and shape is required. Also considered is the case of using binary shape information, instead of conventional 8-bit matting values, and hence fast matting has to be performed online.
2. The inclusion of partial disocclusion data in the auxiliary data to be compressed and transmitted to the decoder is new. Conventionally, the holes are inpainted online and it is difficult to guarantee good synthesis results.
3. Since the quality of the synthesized views depends highly on the quality of the input videos, depth and auxiliary data, it is difficult to ensure perfect synthesis results for all inputs. Therefore, a sweeping function is introduced to emulate the transition from one view to another to reduce the perception of the visually annoying artifacts. The sweeping rate will depend on the matching errors of the input data. For instance, measures of the differences in the shape images, texture images and depth images can be used or appropriately combined to control the sweeping rate and blurring.

The object extraction and background updating processes are similar to those previously described. While consistency between depth, shape and texture is essential for view synthesis using a single view, additional complications occur when two such views are fused or blended together to generate the new views.

In particular the fusion of the two views may generate considerable artifacts due to various inconsistencies in the object shapes, textures (color) image, and depth values. For instance, inconsistency in the two shape images at the intermediate view to be synthesized is the major cause of the ghosting effect due to mismatches of both textures and depth between the two views at the synthesized view. Moreover, inconsistency between the shape and the corresponding disparity map will results in foreground layers "leaking" to background layers and vice versa. Consequently, artifacts will arise as stretching occurs in the textures in the background layers near the foreground boundary.

To address these issues, the proposed "view synthesis algorithm with adjacent views" performs the following steps:
1. Correction of disparity map using shape information.
2. Extraction of object layers, their matte and depth, and update the corresponding background with the partial occlusion data.
3. Rendering using one view at the vicinity of the original view point.
4. In a user region around the mid-point of the two camera views with a user selectable width, performing fusion of views and the desired matte at the desired viewing location and re-matting to ensure a unique object shape for view synthesis.
5. Sweeping may be performed in this user selectable region (which may be included in the auxiliary data according to the pre-estimated matching quality of the two views) to emulate a fly-over effect continuously from one view to the other to reduce the perception of significant artifacts. Additional processing can be performed to shift from view blending to morphing if the difference between the two views is huge, which can be detected from the intermediate results in the above steps.

Correction of the disparity is now described

First of all, the boundary region of a given object, R, will be identified using the shape information. The region can be determined by performing morphological dilating with a certain radius r.

Let $A_F$ be the part in R inside the foreground object under consideration and $A_B$ the remaining part belong to the background area. Left-right checking of the disparity maps in the two views will be performed to detect mismatched disparities (e.g., when left-right error is greater than 1 pixel). Those mismatched areas in foreground (background) will be removed and in-painted from disparities values from the background (foreground). The inpainting can be performed using the efficient filtering method described above or other conventional methods such as nearest neighbor/bi-linear/bi-cubic/TV interpolation, TRAM or bilateral filtering.

This is repeated for each object defined by the shape image in the scene.

Figures 27A, 27B:
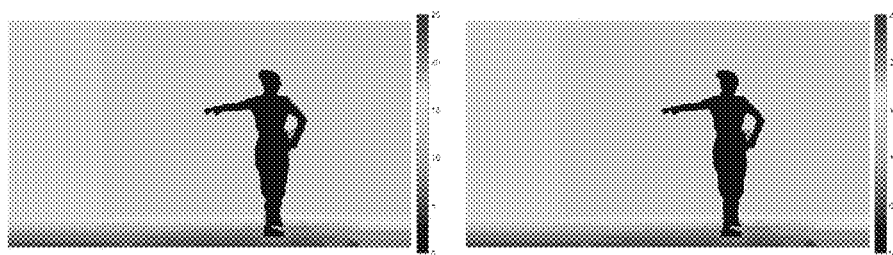
FIG. 27(a) shows the original image and FIG. 27(b) shows the corrected image.
Figure 28A:
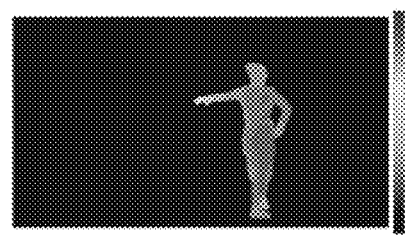
FIG. 28(a) shows the original image and FIG. 28(b) shows the corrected image.
Figure 28B:
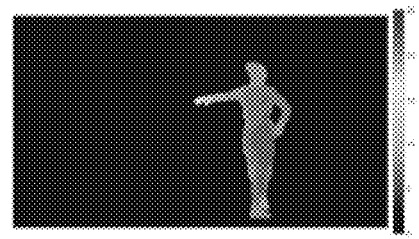

By the above procedures, the discontinuity (boundary) of the disparity map and the shape image can be aligned to minimize possible artifacts caused by in-accurate disparity map. FIGS. 27 and 28 show the original and corrected disparity maps for the background and foreground, respectively for a sequence with two layers. It can be seen that some incorrect values in the background around the neck, hands and legs of the objects are corrected.

Figure 29:
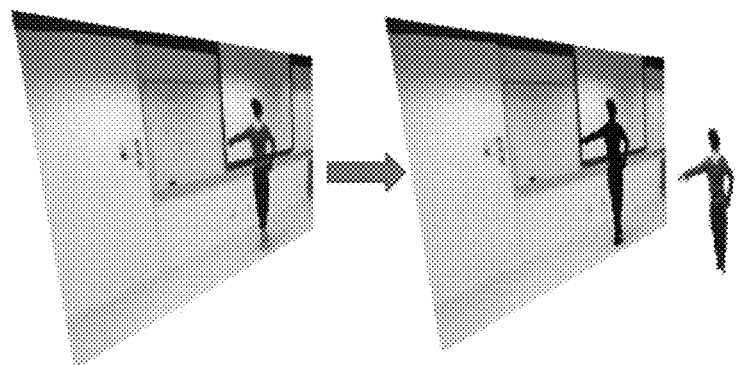
FIG. 29 is an illustration of layer extraction.

The general process for a single view was described above. It is performed separately on the two views after disparity correction. FIG. 29 shows an example of extraction of two layers. The decoded disocclusion data can be used to update the background.

Figure 30A:
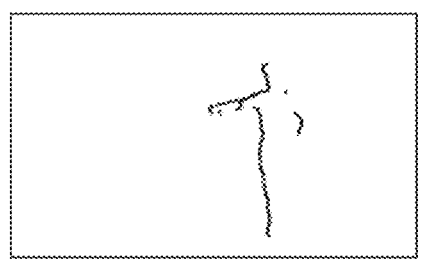
FIG. 30(a) and FIG. 30(b) are examples of occlusion detection in left and right views, respectively.
Figure 30B:
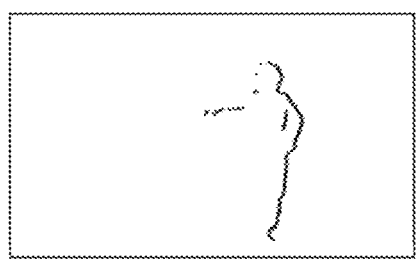

In generating the occlusion data, occlusion detection is used to locate the disocclusion area and the data will be in-painted by an appropriate algorithms or if necessary with human intervention to assure good synthesis quality. For occlusion inside a layer that does not overlap the other layers, i.e. self-occlusion, the in-painting value can be propagated from lower disparity value area using various inpainting algorithms mentioned and stored as auxiliary data to be compressed. FIG. 30 shows the occlusion detected, which will be inpainted and put into the auxiliary data.

The backgrounds on the left and right views are warped using their respect depth map to the desired viewing position. Due to the occlusion at the two boundaries, sudden change in color will occur at these regions if the data from the two views are directly combined.

Figure 31A:
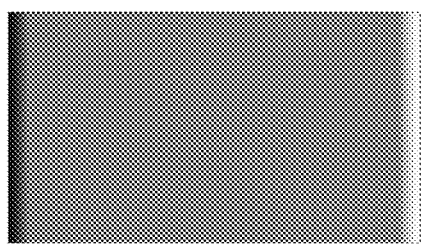
FIG. 31(a) and FIG. 31(b) are examples of weighting masks for left and right views, respectively.
Figure 31B:
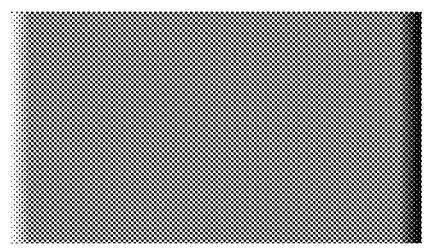
Figure 32:
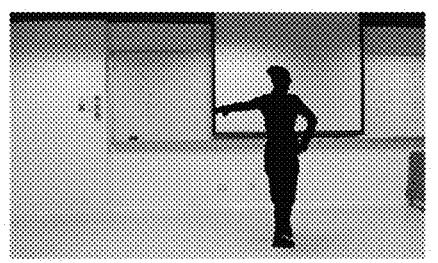
FIG. 32 illustrates warping of background from the left and right views to an intermediate viewpoint.
Figure 32:
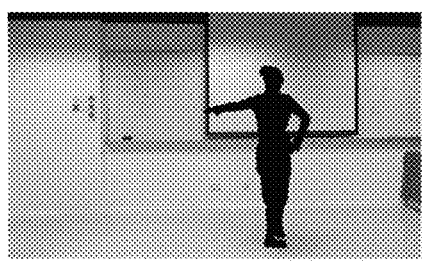
Figure 32:
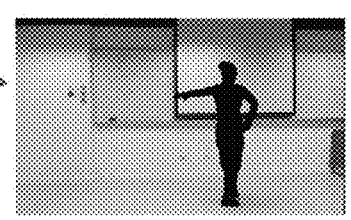
Figure 32:
Figure 33:
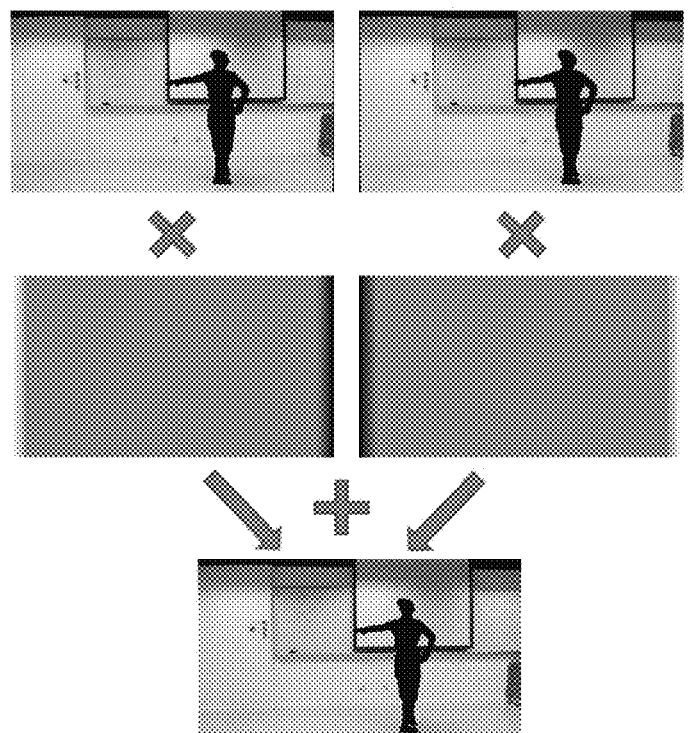
FIG. 33 is an illustration of multiplying the warped background with the weight marks from the left and right view to form a fused background at the intermediate viewpoint.

To deal with this problem at the image boundary, a gradually increasing (decreasing) and gradually decreasing (increasing) weighting mark $w_{p,R}^{(v)}$ ($w_{p,L}^{(v)}$) is used for warped right (left) views as shown in FIG. 31 to account for the missing image data at the other view. For example, as shown in the equation below, the width of the increasing/decreasing region is equal to the disparity of the two camera views and in the middle the weight is equal to one. FIG. 32 shows the background images warped to the desired location. FIG. 33 shows how the warped background images are multiplied to the weighting marks before being added together to form the fused background at the desired view point.

$$w_{p,L}^{(v)} = \begin{cases} 1 + \frac{\max_d(\text{disparity}) - x}{\max_d(\text{disparity})}, & x \in [1, \max_d(\text{disparity})] \\ 1, & \text{otherwise} \\ 1 + \frac{x_{max} - x}{\max_d(\text{disparity})}, & x \in [x_{max} - x, x_{max}] \end{cases}$$

$$w_{p,R}^{(v)} = \begin{cases} \frac{x}{\max_d(\text{disparity})}, & x \in [1, \max_d(\text{disparity})] \\ 1, & \text{otherwise} \\ 1 + \frac{x_{max} - x}{\max_d(\text{disparity})}, & x \in [x_{max} - x, x_{max}] \end{cases},$$

where $\max_d(\text{disparity})$ is the maximum disparity over the depth map d, x is the horizontal coordinate of the weighting image, and $x_{max}$ is the size of the image.

When the two views are fused to synthesize at a certain viewpoint, the weighted image will be blended or combined as $$I_p^{(v)} = f(v)I_{p,L}^{(v)} + (1-f(v))I_{p,R}^{(v)} \quad (24)$$

where $I_p^{(v)}$ is the color at position p and a fractional distance v from the left to the right views, and $I_{p,L}^{(v)}$ and $I_{p,R}^{(v)}$ are respectively the color of the pixel at position p of the left and right views warped to the viewing position parameter v. $f(v)$ is a blending function, which is determined by the mask of the background layer of left/right view $S_{p,L}^{(v)}$ and the weighting mask $w_{p,L}^{(v)}$.

$$f(v) = \frac{v \times S_{p,L}^{(v)} \times w_{p,L}^{(v)}}{v \times S_{p,L}^{(v)} \times w_{p,L}^{(v)} + (1-v) \times S_{p,R}^{(v)} \times w_{p,R}^{(v)}}. \quad (25)$$

Given layers warped to the desired intermediate viewpoint using the depth maps, the two warped views need to be fused together. Major artifacts usually arise from histogram/illuminance bias of views, shape deformation and matting errors. Histogram/illuminance bias for in-painting data is usually small and can be easily handled in real-time while for the whole image, it could cost higher computation time.

Shape deformation, on the other hand, is more critical as it is the major cause of ghosting artifacts and mismatch of textures. The artifacts can also be more obvious with the increase in the disparity of the layers as the deformation gets more severe. To address this problem, a unique shape mask (or boundary) is determined at the desired intermediate viewpoint.

Given the warped shapes (or layer mask) $S_{p,L}^{(v)}$ and $S_{p,R}^{(v)}$ respectively from left and right views at the viewing position parameter v, a new mask will be determined to ensure a unique shape at this view. One simple and effective approach is to construct a shape mask from $$B_p^{(v)} = \begin{cases} vS_{p,L}^{(v)} + (1-v)S_{p,R}^{(v)} & \text{if } \begin{aligned} vS_{p,L}^{(v)} + (1-v)S_{p,R}^{(v)} \geq \\ (1-a)(\overline{vS_{p,L}^{(v)}} + (1-v)\overline{S_{p,L}^{(v)}}) \end{aligned} \\ 0 & \text{otherwise} \end{cases} \quad (26)$$

where a is a threshold parameter close to one and it can be pre-optimized and included in the auxiliary data, if necessary.

The mask $B_p^{(v)}$ can be smoothed or re-matted to obtain the final matte $S_p^{(v)}$ by Gaussian kernel filtering on the boundary areas of $B_p^{(v)}$ as:

$$S_p^{(v)} = \frac{1}{S_p} \sum_{j \in W_p} \exp\left(-\frac{1}{2\sigma^2}\|p-j\|_2^2\right) B_p^{(v)}, \quad (27)$$

$$\text{where } S_p = \sum_{j \in W_p} \exp\left(-\frac{1}{2\sigma^2}\|p-j\|_2^2\right).$$

Figure 34:
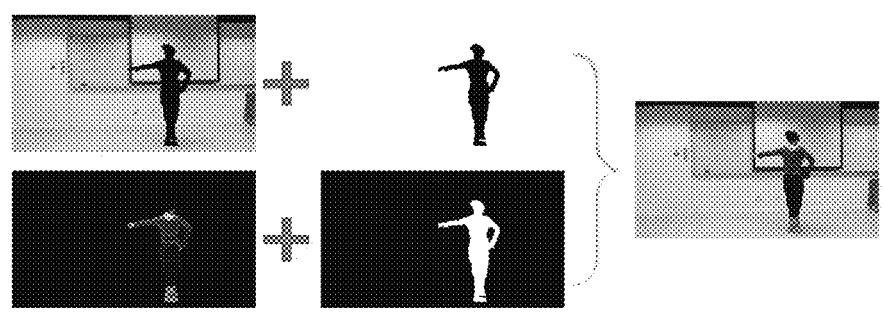
FIG. 34 shows the fusion of layers for a two layer example.

The corresponding matte for the background layer is $S_{p,b}^{(v)} = 1 - S_p^{(v)}$ where b indicates it is from the background. FIG. 34 shows an example of fusing the foreground and background for a two layers example. The fusion can be used to emulate fly over from one view to another or to support user interactive change of the view point. Usually it can be done at a particular frame or continuously for successive video frames.

For fly-over, an appropriate sweeping rate from one view to another is usually chosen. The user can interact by freezing the view and selecting different viewpoints. The sweeping rate can be chosen to be inversely proportional to the difference between baseline disparity and maximum disparity. For example, consider the case where the baseline disparity is $d_B$, maximum disparity $d_M$, the sweeping rate should be:

$$R_s = \frac{r}{d_M - d_B} \quad (28)$$

where r is a preset selected factor to account for computation speed and user's subjective perception of disparity map.

For a high quality/accurate disparity map, the sweeping rate can be slower and vice versa, since there will be fewer visual artifacts. Additional blurring is performed at significant mismatched areas as measured by the differences in the warped mattes $S_{p,L}^{(v)}$ and $S_{p,R}^{(v)}$ and the texture images so as to reduce potential visual artifacts. The support of the filtering and hence the resulting blurring can be included in the tuned and control parameters of the auxiliary data.

For example, the measure of the shape deformation/difference $\varepsilon_S$ can be determined as the proportion of disagreement area when two shapes in both views are warped to the same view point. Consider the warping of the shape of the right view to the left view point and let $R_1$ be the area of overlap between the warped and original view and $R_2$ be the unmatched area. Then, one reasonable choice of $\varepsilon_S$ is $$\varepsilon_S = \frac{R_2}{R_1 + R_2}. \quad (29)$$

Figure 35:
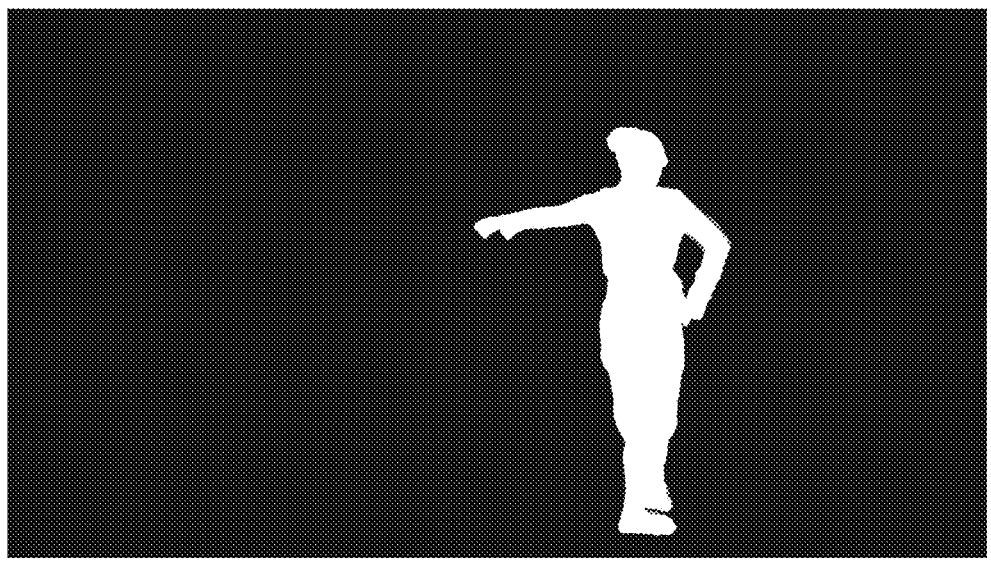
FIG. 35 shows matched and unmatched areas of warped shapes.

Other measures can be similarly constructed and be extended to color images. An example of the matched and unmatched areas for the two layers example above is shown in FIG. 35.

Therefore, the larger the value of $R_2$, the larger will be the shape deformation and thus the sweeping rate should accordingly increase to avoid prolong perception of significant visual artifacts. Simultaneously, blurring can be introduced to emulate motion blur so as to suppress annoying artifacts. r can then be made proportional to $\varepsilon_S$ or other deformation measure. An exemplary choice of r is $r=100\varepsilon_S$.

If necessary, the intensity of the synthesized views can be gradually decreased to the mid-point and increased again to the other view to emulate fading effects and hence suppress further the undesirable artifacts. The measure in Equation (29) can be used to control the degree of fading etc.

While the invention has been particularly shown and described with reference to preferred embodiments thereof, it will be understood by those skilled in the art that various changes in form and details may be made therein without departing from the spirit and scope of the invention. Additionally, many modifications may be made to adapt a particular situation to the teachings of the claimed subject matter without departing from the central concept described herein. Therefore, it is intended that the claimed subject matter not be limited to the particular examples disclosed, but that such claimed subject matter may also include all implementations falling within the scope of the appended claims, and equivalents thereof.

What is claimed is:

1. A method for rendering improved new views of two-dimensional input video images using auxiliary data that includes major depth discontinuities in the form of available shape images data, partial occlusion data and depth information in the form of a depth map, comprising the steps of:
   using a shape assisted Bayesian bi-lateral filtering based matting approach to extract image objects and their depth values from the input videos at partially occluded regions, as specified by labels associated with the shape images data of the auxiliary data;
   updating the image background by inpainting missing data and image holes using both the data and holes as well as the depth map and the shape images data information with object association, and refinement of the depth values by filtering after extraction of each object;
   using the partial occlusion data and its coverage, which is estimated by the depth map and shape information of the auxiliary data to reduce the artifacts due to limited performance of the inpainting of missing data or holes; and
   using the objects extracted at the specified partial occlusion regions, which are obtained using the depth map and shape information, and the background to perform view synthesis for the rendering.

2. The method of claim 1 wherein the shape image data information in the auxiliary data provides the approximate location of depth discontinuities for correction.

3. The method of claim 2 wherein, in the case of a gray scale shape image, the shape image data information provides the approximate amount of foreground at the depth discontinuity locations.

4. The method of claim 1 wherein the partial occlusion data and the shape image data are used to indicate the major disocclusion areas and the missing information required to support a given view point change.

5. The method of claim 1 wherein the two-dimensional input video and auxiliary data are transmitted, and the partial occlusion data is included with the image data, depth data and matte, and they are packed together with the shape image data information, depth map of the input image/video and other control and tuned parameters to form auxiliary data and to assist view synthesis.

6. The method of claim 5 wherein the two-dimensional input video and auxiliary data are compressed prior to transmission in order to reduce transmission bandwidth.

7. The method of claim 1 wherein the two-dimensional input video and auxiliary data are stored, and the partial occlusion data is included with the image data, depth data and matte, and they are packed together with the shape image data information, depth map of the input image/video and other control and tuned parameters to form auxiliary data and to assist view synthesis.

8. The method of claim 7 wherein the two-dimensional input video and auxiliary data are compressed prior to storage.

9. The method of claim 5 wherein the auxiliary data is embedded in the video data for transmission.

10. The method of claim 5 wherein the auxiliary data is transmitted as a separate data stream and is synchronized with the video data.

11. The method of claim 1 wherein the steps of extracting image objects and updating the image background and the depth values further comprise the steps in sequence of:
   starting from the image object with the smallest depth, using the shape image to extract the foreground from the background using matting;
   filling in the image data at the disocclusion area of the remaining background by matting at the boundary of the partial occlusion data;
   overwriting at the boundary all pixels covered by the partial occlusion data in the remaining background to remove the trace of foreground in the updated background;
   providing additional inpainting as required to fill in possible holes;
   updating the depth of the new background from the partial occlusion data;
   inpainting as required to fill in the holes within the boundary defined by the object with the next smallest depth until all objects are processed; and
   repeating the steps for the next object with the smallest depth.

12. The method of claim 1 wherein the inpainted objects are reconstructed into image layers having their own depth maps.

13. The method of claim 12 wherein the layers are rendered one after the other in ascending order of their depth values.

14. The method of claim 1 wherein the extracted objects are inpainted with the appropriate disocclusion data in a certain order and an artifacts-aware view synthesis algorithm is used to support the display or rendering of this content in one of conventional 2D, stereo, and autostereoscopic displays.

15. The method of claim 11 wherein the step of extraction by matting is formulated efficiently as two bi-lateral filtering processes, which can be carried out using shifts and additions and without multiplications, using the canonical sign digits (CSD) representation of the filter coefficients.

16. The method of claim 15 where in wherein filter products can be precomputed and stored as canonical signed digits (CSD).

17. The method of claim 1 wherein the step of reducing artifacts involves human intervention through a semi-automatic user interface that allows the user to specify shape image with object association labels and a rate of sweeping for controlling view transition so as to ensure that the quality of the disocclusion information and hence the quality of the view synthesis, is maintained.

18. The method of claim 1 wherein the auxiliary data comprises:
   shape images with an identifier for indicating the depth order of each view;
   depth map of each two dimensional video;
   partial occlusion data, which include i) the image, matte and depth data of the partial occlusion specified by the shape and depth map of each object in each view, and ii) image, matte and depth data of the self-occlusion data; and
   other control or tuned parameters required in the algorithms in performing the object extractions, update of background, joint depth-texture filtering and view synthesis.

19. The method of claim 1 wherein foreground and background pixels can be in-painted from the neighbors of the known foreground and background to the unknown regions gradually.

20. The method of claim 15 wherein, instead of estimating the matte and smoothing, the binary shape image is filtered to obtain a predefined profile independent of the observation.

21. The method according to claim 6 wherein the bandwidth is further reduced by coding the partial-occlusion data according to at least one of the following methods:
   predict the partial occlusion data from the input video and depth map,
   predict each block of the partial occlusion data from previous coded neighboring blocks, and
   gradually increase the quantization error for blocks further away from the starting depth discontinuities on the same row.

22. The method of claim 1 further including the step of refining the depth map by bilateral filtering, where the refined depth value at each pixel is obtained from the average of neighboring pixels, weighted by the spatial difference and intensity difference from the current pixel.

23. The method of claim 22 wherein the bilateral filtering comprises the steps of:
   using temporal weightings to improve the temporal stability of the depth map, especially at static region;
   using a local context mask function to emphasis the local context based on the edge information;
   reducing the weighting around the edges of the disparity map by adding a depth confidence term;
   quantizing the weighting functions to a limited set of values, so that the product can be precomputed and represented in the form of canonical signed digits (CSD) that it can be implemented by additions only; and
   using separable spatial and temporal filtering to reduce arithmetic complexity.

24. The method of claim 1 further including the step of introducing a sweeping function, which depends on the matching errors of the input data, to emulate the transition from one view to another to reduce the perception of the visually annoying artifacts.

25. The method of claim 14 wherein the artifacts-aware view synthesis algorithm comprises the steps of:
   correcting the disparity map using shape information, wherein the disparity map has more than two layers and the choice of layer is determined using shape information;
   extracting object layers, their matte and depth, and updating the corresponding background with the partial occlusion data containing the object association tables indicating the layers to be extracted;
   rendering the images using one view at the vicinity of the original view point with partial occlusion data containing the object association labels, which indicates the object to be un-occluded; and
   in a user region around the mid-point of the two camera views with a user selectable width, performing fusion of views and the desired matte at the desired viewing location based on the transition rate specified by a sweeping parameter provided by the user and re-matting to ensure a unique object shape for view synthesis.

26. The method of claim 25 wherein the fusion of views includes the step of performing a sweeping function in the user selectable region to emulate a fly-over effect continuously from one view to the other, a sweeping rate of view transition is included as a control parameter which can be specified by the user to reduce the perception of significant artifacts.

27. The method of claim 14 wherein the artifacts-aware view synthesis algorithm comprises the steps of:
- synthesizing the views required by the stereo or autostereoscopic displays corresponding to the left (right) eye using the left (right) stereo videos, the 2D video plus auxiliary data with the depth synthesis method;
- using a user specified sweeping rate for controlling the rate of view transition and morphing between left and right stereo videos and
- if only one video and its associated depth video are available, synthesizing all the views required using the 2D plus auxiliary data with the depth method.

* * * * *